United States Patent
Sugiyama et al.

[11] Patent Number: 5,553,051
[45] Date of Patent: Sep. 3, 1996

[54] INCREASED INTENSITY OPTICAL RECORDING MEDIUM WITH ADJACENT GROOVES OF DIFFERENT OPTICAL DEPTH AND A METHOD AND APPARATUS FOR REPRODUCING THE SAME

[75] Inventors: Hisataka Sugiyama, Kodaira; Takeshi Maeda, Kokubunji; Hiroshi Ide, Kodaira; Kazuo Shigematsu, Saitama-ken; Masaru Ito, Sagamihara, all of Japan

[73] Assignee: Hitachi, Ltd., Tokyo, Japan

[21] Appl. No.: 402,304

[22] Filed: Mar. 10, 1995

Related U.S. Application Data

[63] Continuation of Ser. No. 582,095, Sep. 14, 1990, abandoned, which is a continuation-in-part of Ser. No. 239,289, Sep. 1, 1988, Pat. No. 4,980,877.

[30] Foreign Application Priority Data

Sep. 18, 1989 [JP] Japan ..................................... 1-239979

[51] Int. Cl.⁶ ...................................................... G11B 7/00
[52] U.S. Cl. .................... 369/109; 369/275.1; 369/275.4
[58] Field of Search ............................. 369/275.1–275.5, 369/109, 285, 48, 100, 116, 32, 44.37, 112, 111

[56] References Cited

U.S. PATENT DOCUMENTS

| | | | |
|---|---|---|---|
| 4,245,229 | 1/1981 | Stephens | 369/275.5 |
| 4,385,372 | 5/1983 | Drexler | 369/109 |
| 4,556,967 | 12/1985 | Braat | 369/275.3 |
| 4,835,756 | 5/1989 | Kaku et al. | 369/275.4 |
| 4,905,214 | 2/1990 | Nagashima | 369/112 |
| 4,930,116 | 5/1990 | Dil | 369/275.4 |
| 4,935,913 | 6/1990 | Shinoda | 369/32 |
| 4,963,464 | 10/1990 | Setani | 369/109 |
| 4,985,881 | 1/1991 | Saito et al. | 369/275.4 |
| 5,003,527 | 3/1991 | Matsumoto et al. | 369/109 |

FOREIGN PATENT DOCUMENTS 54-136303 of 1979 Japan.
57-105828 of 1982 Japan.
61-192047 of 1987 Japan.

*Primary Examiner*—Georgia Y. Epps
*Assistant Examiner*—Nabil Hindi
*Attorney, Agent, or Firm*—Antonelli, Terry, Stout & Kraus

[57] ABSTRACT

An optical recording medium on which information is recorded by irradiating the medium with a light spot to cause a characteristic change of an actual reflection factor, the optical recording medium including grooves of different optical depths which extend in a direction in which the light spot is moved relative to the medium and which are alternately and periodically formed in a direction perpendicular to the relative movement direction of the light spot so that a plurality of grooves thereof can be covered by the light spot, and mark recording regions provided on the flat surfaces between the grooves, the pitch of the flat surfaces between the grooves being selected to be substantially half the diameter of the light spot, thus increasing the recording density and preventing the cross-talk. A method and apparatus for reproducing the information recorded on the medium are provided. Of the reflected and diffracted light distribution obtained by irradiating the light spot on the optical recording medium, the intensity change of the 0-order and third-order interference regions on the shallow groove's side are detected in the form of electrical signals, and information signals corresponding to mark are reproduced on the basis of the detected signals.

24 Claims, 17 Drawing Sheets

FIG. 4A

| | A2<br>(m, m')<br>A1 | 0.94 0.94<br>(0,0)<br>0.675 0.675 | 0.78 0.94<br>(0,+1)<br>0.78 | 0.94 0.78<br>(0,-1)<br>0.94 0.78 | 0.78 0.78<br>(+1,-1)<br>0 | 0.675 0.675<br>(+1,+1)<br>0.94 | 0.94 0.675<br>(-1,-1)<br>0.94 | 0 0.78<br>(0,+2)<br>0 0.78 | 0.78 0<br>(0,-2)<br>0.78 0 | 0 0.78<br>(+1,+2)<br>0 0.925 | 0.64 0<br>(+1,-2)<br>0 |
|---|---|---|---|---|---|---|---|---|---|---|---|
| 1 | $(r_2)^2$ | $(1-\gamma)^2/4$ | | | | | | | | | |
| 2 | $(r_2 \cdot r_4)$ | $\gamma \frac{(1-\gamma)}{2} \times B\cos\phi B$ | | | | | | $(1-\gamma)/\pi$<br>$\times C\sin(\pi_T/2)$<br>$\times\cos\phi B$<br>$+\gamma/\pi$<br>$\times B\cos(\pi_T/2)$<br>$\times\cos\phi B$ | $(1-\gamma)/\pi$<br>$\times C\cos(\pi_T/2)$<br>$\times\cos\phi B$<br>$+\gamma/\pi$<br>$\times B\cos(\pi_T/2)$<br>$\times\cos\phi B$ | | |
| 3 | $(r_1)^2$ | $(1-\gamma)^2/16$ | | | $-2/\pi^2 \times \sin^2$<br>$\{\pi(1-\gamma)/4\}$ | $1/\pi^2 \times \sin^2$<br>$\{\pi(1-\gamma)/4\}$ | $1/\pi^2 \times \sin^2$<br>$\{\pi(1-\gamma)/4\}$ | $-(1-\gamma)/4\pi$<br>$\times C\sin(\pi_T/2)$<br>$\times\cos\phi B$ | $-(1-\gamma)/4\pi$<br>$\times C\sin(\pi_T/2)$<br>$\times\cos\phi B$ | | |
| 4 | $(r_3)^2$ | $(1-\gamma)^2/16$ | | | $-2/\pi^2 \times \sin^2$<br>$\{\pi(1-\gamma)/4\}$ | $1/\pi^2 \times \sin^2$<br>$\{\pi(1-\gamma)/4\}$ | $1/\pi^2 \times \sin^2$<br>$\{\pi(1-\gamma)/4\}$ | $-(1-\gamma)/4\pi$<br>$\times C\cos(\pi_T/2)$ | $-(1-\gamma)/4\pi$<br>$\times C\cos(\pi_T/2)$ | | |
| 5 | $(r_1 r_3)$ | $(1-\gamma)^2/8$ | | | $4/\pi^2 \times \sin^2$<br>$\{\pi(1-\gamma)/4\}$ | $-2/\pi^2 \times \sin^2$<br>$\{\pi(1-\gamma)/4\}$ | $-2/\pi^2 \times \sin^2$<br>$\{\pi(1-\gamma)/4\}$ | $-(1-\gamma)/2\pi$<br>$\times C\cos(\pi_T/2)$ | $-(1-\gamma)/2\pi$<br>$\times C\cos(\pi_T/2)$ | | |
| 6 | $(r_2 r_1)$ | $(1-\gamma)^2/4$ | | | | | | | | | |
| 7 | $(r_2 r_3)$ | $(1-\gamma)^2/4$ | | | | | | | | | |
| 8 | $(r_1 r_4)$ | $\gamma(1-\gamma)/4$<br>$\times B\cos\phi B$ | $\{1/\pi \times \sin$<br>$\{\pi(1-\gamma)/4\}$<br>$\times B\sin\phi B$ | $-\gamma/\pi \times \sin$<br>$\{\pi(1-\gamma)/4\}$<br>$\times B\sin\phi B$ | | | | $-(1-\gamma)/2\pi$<br>$\times C\sin(\pi_T/2)$<br>$\times\cos\phi B$<br>$-\gamma/2\pi$<br>$\times B\cos(\pi_T/2)$<br>$\times\cos\phi B$ | $-(1-\gamma)/2\pi$<br>$\times C\sin(\pi_T/2)$<br>$\times\cos\phi B$<br>$-\gamma/2\pi$<br>$\times B\cos(\pi_T/2)$<br>$\times\cos\phi B$ | $2/\pi \times \sin$<br>$\{\pi/4(1-\gamma)\}$<br>$\times C\sin(\pi_T/2)$<br>$\times C\sin\phi B$ | $-2/\pi \times \sin$<br>$\{\pi/4(1-\gamma)\}$<br>$\times C\sin(\pi_T/2)$<br>$\times C\sin\phi B$ |
| 9 | $(r_3 r_4)$ | $\gamma(1-\gamma)/4$<br>$\times B\cos\phi B$ | $-\gamma/\pi \times \sin$<br>$\{\pi(1-\gamma)/4\}$<br>$\times B\sin\phi B$ | $\{1/\pi \times \sin$<br>$\{\pi(1-\gamma)/4\}$<br>$\times B\sin\phi B$ | | | | $-(1-\gamma)/2\pi$<br>$\times C\sin(\pi_T/2)$<br>$\times\cos\phi B$<br>$-\gamma/2\pi$<br>$\times B\cos(\pi_T/2)$<br>$\times\cos\phi B$ | $-(1-\gamma)/2\pi$<br>$\times C\sin(\pi_T/2)$<br>$\times\cos\phi B$<br>$-\gamma/2\pi$<br>$\times B\cos(\pi_T/2)$<br>$\times\cos\phi B$ | $-2/\pi \times \sin$<br>$\{\pi/4(1-\gamma)\}$<br>$\times C\sin(\pi_T/2)$<br>$\times C\sin\phi B$ | $2/\pi \times \sin$<br>$\{\pi/4(1-\gamma)\}$<br>$\times C\sin(\pi_T/2)$<br>$\times C\sin\phi B$ |
| 10 | $(r_4)^2$ | $(\gamma/2)^2 B^2$ | | | | | | $\gamma/\pi$<br>$\times BC\sin(\pi_T/2)$ | $-\gamma/\pi$<br>$\times BC\sin(\pi_T/2)$ | | |

FIG. 4B

| $A_1$ \ $A_2$ ($mm'$) $A_3$ $A_4$ | 0 0.64 0 (-1,+2) 0 | 0.78 (-1,-1) 0.925 | 0 0.65 0 (+2,+2) 0.925 | 0.65 0 (-2,-2) 0.925 | 0 (+3,+3) 0.64 0 | 0 (-3,-3) 0.64 0 | 0 (+1,+3) 0 0.78 | 0 (-1,-3) 0 0.78 | 0 (+2,+3) 0 0.78 | 0 (+1,-2) 0 0.78 |
|---|---|---|---|---|---|---|---|---|---|---|
| 1 $(r_2)^2$ | | | $1/\pi^2 \times \cos^2(\pi_T/2)$ | $1/\pi^2 \times \cos^2(\pi_T/2)$ | | | | | | |
| 2 $(r_2 \cdot r_4)$ | | | $1/\pi^2 \times C\sin(\pi_T) \times \cos\phi B$ | $-1/\pi^2 \times C\sin(\pi_T) \times \cos\phi B$ | | | | | | |
| 3 $(r_1)^2$ | | | $1/4\pi^2 \times \cos^2(\pi_T/2)$ | $1/4\pi^2 \times \cos^2(\pi_T/2)$ | $1/9\pi^2 \times \sin^2\{3\pi(1-\tau)/4\}$ | $1/9\pi^2 \times \sin^2\{3\pi(1-\tau)/4\}$ | $-2/3\pi^2 \times \sin \{3\pi(1-\tau)/4\} \times \sin\{3\pi(1-\tau)/4\}$ | $-2/3\pi^2 \times \sin \{3\pi(1-\tau)/4\} \times \sin\{3\pi(1-\tau)/4\}$ | | |
| 4 $(r_3)^2$ | | | $1/4\pi^2 \times \cos^2(\pi_T/2)$ | $1/4\pi^2 \times \cos^2(\pi_T/2)$ | $1/9\pi^2 \times \sin^2\{3\pi(1-\tau)/4\}$ | $1/9\pi^2 \times \sin^2\{3\pi(1-\tau)/4\}$ | $-2/3\pi^2 \times \sin \{3\pi(1-\tau)/4\} \times \sin\{3\pi(1-\tau)/4\}$ | $4/3\pi^2 \times \sin \{3\pi(1-\tau)/4\} \times \sin\{3\pi(1-\tau)/4\}$ | | |
| 5 $(r_1 \cdot r_3)$ | | | $1/2\pi^2 \times \cos^2(\pi_T/2)$ | $1/2\pi^2 \times \cos^2(\pi_T/2)$ | | $-2/9\pi^2 \times \sin^2\{3\pi(1-\tau)/4\}$ | | | | |
| 6 $(r_2 \cdot r_1)$ | | | $-1/2\pi^2 \times \cos^2(\pi_T/2)$ | $-1/2\pi^2 \times \cos^2(\pi_T/2)$ | | | | | | |
| 7 $(r_2 \cdot r_3)$ | | | $-1/2\pi^2 \times \cos^2(\pi_T/2)$ | $-1/2\pi^2 \times \cos^2(\pi_T/2)$ | | | | | | |
| 8 $(r_1 \cdot r_4)$ | $-2/\pi^2 \times \sin \{\pi(1-\tau)/4\} \times \sin(\pi_T/2) \times C\sin\phi B$ | $2/\pi^2 \times \sin \{\pi(1-\tau)/4\} \times \sin(\pi_T/2) \times C\sin\phi B$ | $-1/2\pi^2 \times C\sin(\pi_T) \times \cos\phi B$ | $-1/2\pi^2 \times C\sin(\pi_T) \times \cos\phi B$ | | | | | $-2/3\pi^2 \times \sin(\pi_T/2) \times C\sin \{3\pi(1-\tau)/4\} \times \sin\phi B$ | $-2/3\pi^2 \times \sin(\pi_T/2) \times C\sin \{3\pi(1-\tau)/4\} \times \sin\phi B$ |
| 9 $(r_3 \cdot r_4)$ | $2/\pi^2 \times \sin \{\pi(1-\tau)/4\} \times \sin(\pi_T/2) \times C\sin\phi B$ | $-2/\pi^2 \times \sin \{\pi(1-\tau)/4\} \times \sin(\pi_T/2) \times C\sin\phi B$ | $-1/2\pi^2 \times C\sin(\pi_T) \times \cos\phi B$ | $-1/2\pi^2 \times C\sin(\pi_T) \times \cos\phi B$ | | | | | $2/3\pi^2 \times \sin(\pi_T/2) \times C\sin \{3\pi(1-\tau)/4\} \times \sin\phi B$ | $2/3\pi^2 \times \sin(\pi_T/2) \times C\sin \{3\pi(1-\tau)/4\} \times \sin\phi B$ |
| 10 $(r_4)^2$ | $(1/2)B^2$ | | $1/\pi^2 \times C^2\sin^2(\pi_T/2)\}1/2$ | $1/\pi^2 \times C^2\sin^2(\pi_T/2)/2$ | | | | | | |

$\tau = W/P$ (W: GROOVE WIDTH) (P: TRACK PITCH)

$B = \sqrt{2}\{1+\cos(\phi S-\phi D)\}1/2 = 2\cos\{(\phi S+\phi D)/2\}$ $C = 2\sin\{(\phi S-\phi D)/2\}$
$\psi 3 = (\phi S+\phi D)$ $\phi S = 4\pi dS/\lambda$
$\phi D = 4\pi dD/\lambda$ F I G. 5A
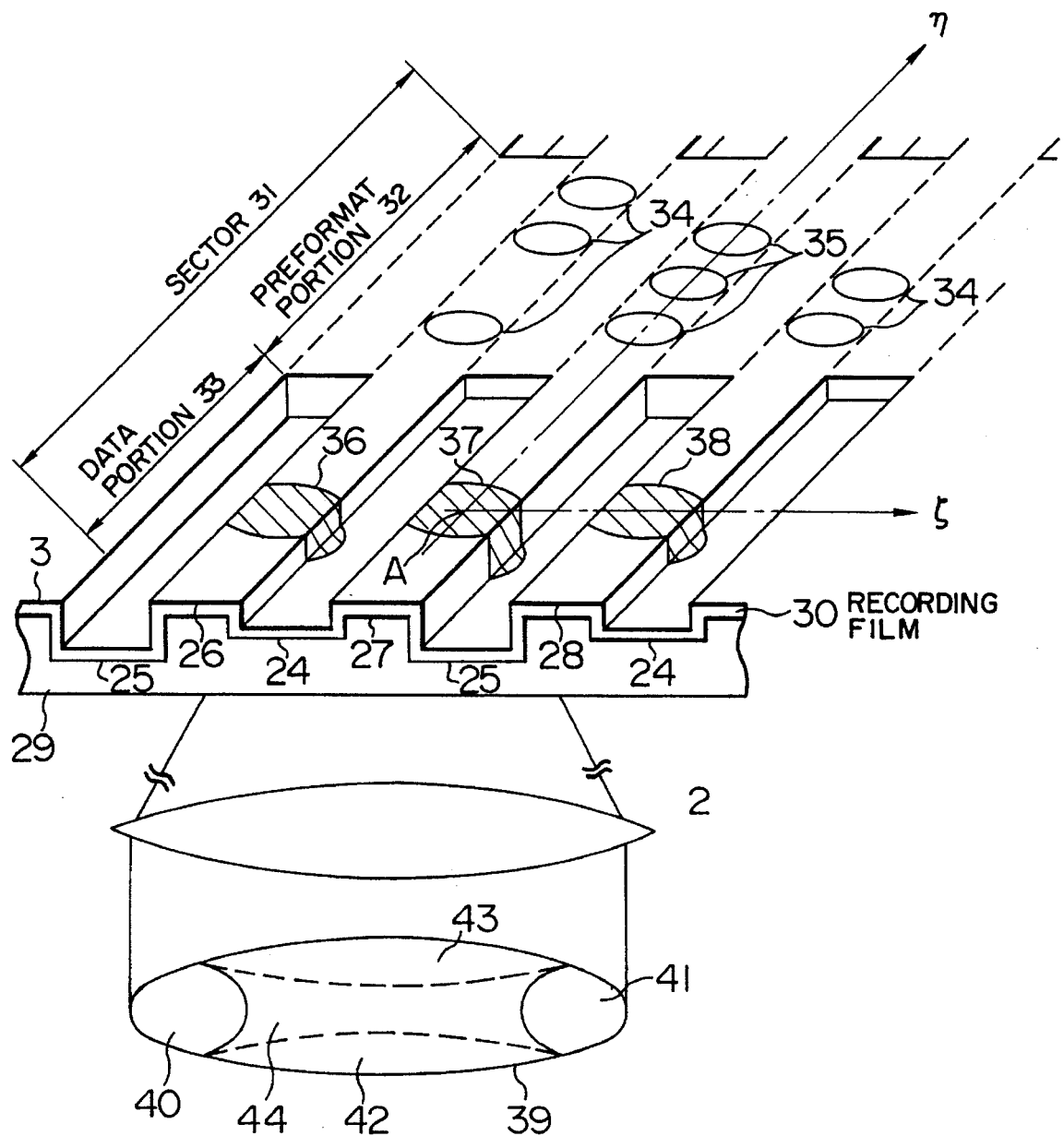

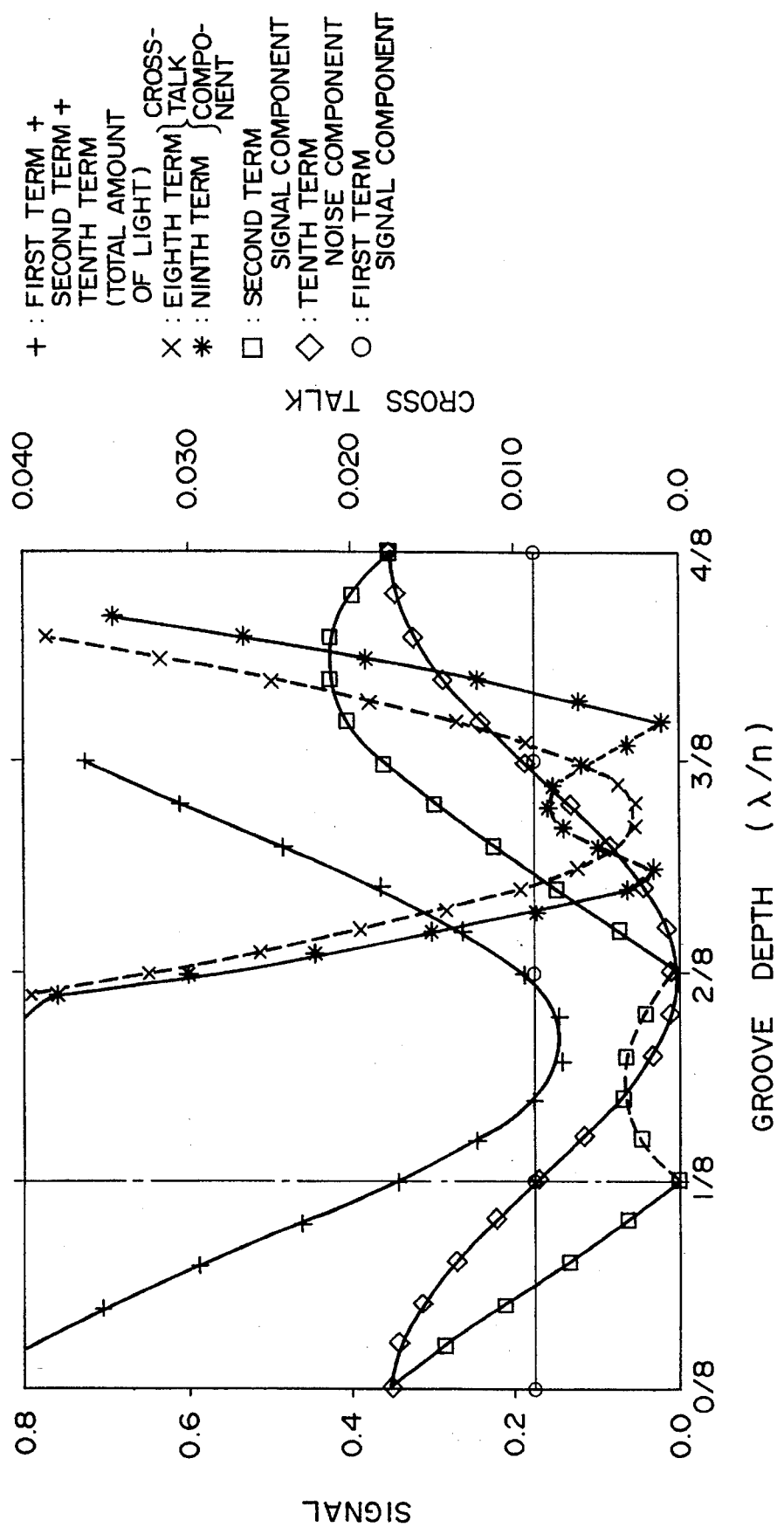

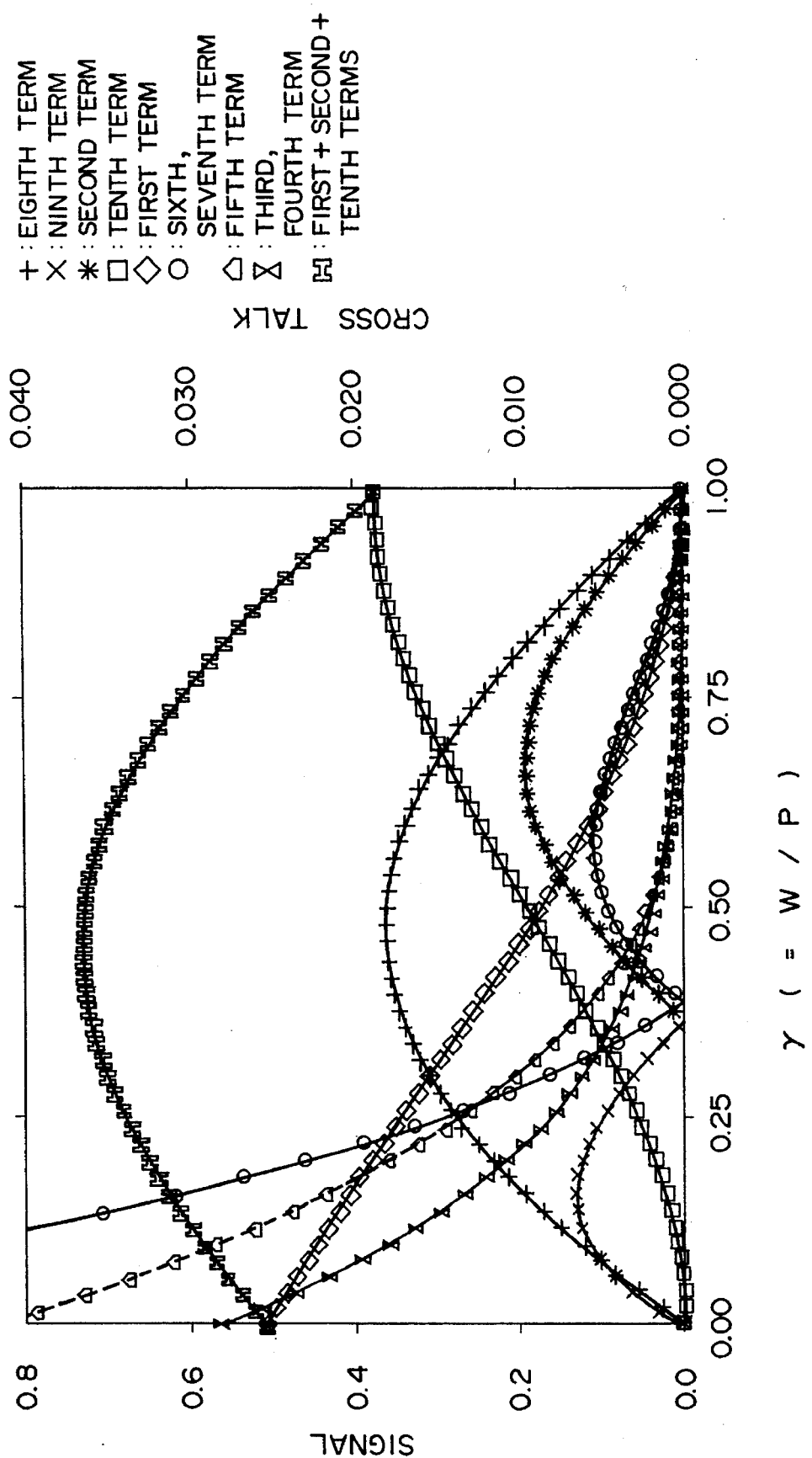

F I G. 14
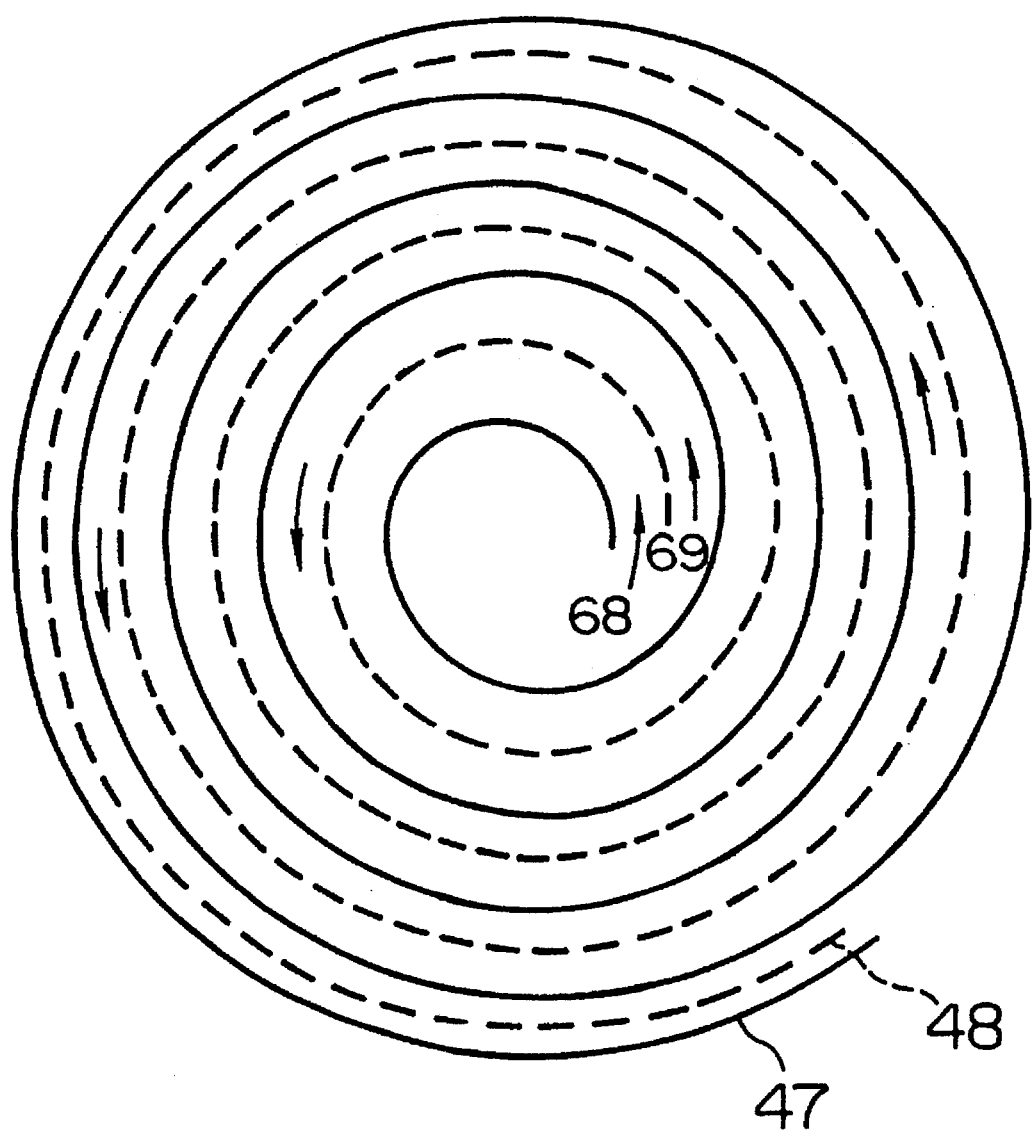

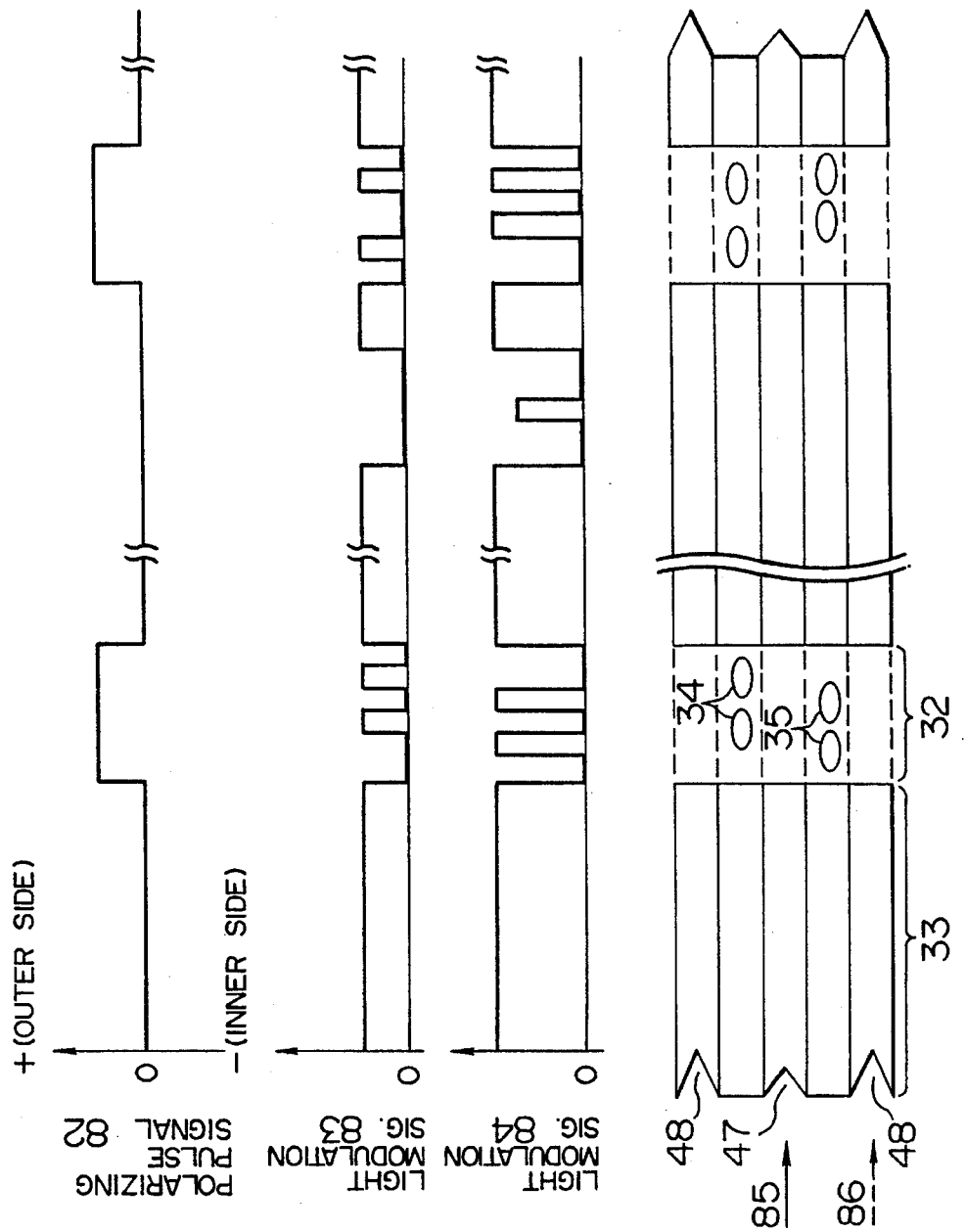

INCREASED INTENSITY OPTICAL RECORDING MEDIUM WITH ADJACENT GROOVES OF DIFFERENT OPTICAL DEPTH AND A METHOD AND APPARATUS FOR REPRODUCING THE SAME

This application is a continuation application of Ser. No. 07/582,095, filed Sept. 14, 1990, now abandoned, which was a continuation-in-part application of Ser. No. 07/239,289, filed Sept. 1,1988, now U.S. Pat. No. 4,980,877.

CROSS-REFERENCES TO THE RELATED APPLICATION

This application relates to a copending U.S. application Ser. No. 07/239,289 entitled "Optical Recording and Reproducing System Using Optical Recording Medium", filed on Sept. 1, 1988 by the present inventors, assigned to the present assignee, now U.S. Pat. No. 4,980,877, the content of which is incorporated herein by reference.

BACKGROUND OF THE INVENTION

This invention relates to an optical recording medium and a technique for reproducing the optical recording medium, and particularly to an optical recording medium suitable for use in increasing the recording density, and a method and apparatus for reproducing the same.

This invention is particularly suited for the use of a write once type or erasable optical disk for recording by utilizing the local change of characteristics, for example, change of reflection factor, transmissitivity, depth or the like of the medium due to the irradiation of a light spot on the medium.

In a conventional recording and reproducing scheme for, for example, a filing optical disk, a groove of a constant depth is provided in a spiral form on the disk so that a plurality of grooves are arranged to have an equal spacing in the radial direction of the disk, and a light spot is irradiated on the groove or the region between the grooves so that information is recorded, reproduced or erased along the center thereof. This groove serves as a guide for guiding the light spot along the track. In order to reduce the noise upon recording and reproduction, the width of the region between the grooves (or the distance between the track) is desired to be smaller than the diameter of each of the recorded pits which are recorded as information on the disk. Such a high density recording as to record the tracks of which the spacing is smaller than the diameter of the light beam spot has encountered with the following two problems.

The first problem is the problem with the tracking. In general, the positional shift of the light spot in the radial direction with respect to the center of the track, or the shift of the light spot out of track is detected by the so-called "push-pull system" which is well known. In other words, this system utilizes the action of the structure of grooves peripodically arranged in the radial direction as a diffraction grating to the light spot. If the distance between the tracks, or the distance between the grooves is reduced in order to increase the storage capacity per unit area, or the storage density, the spatial frequency in the radial direction of the disk which frequency is expressed by the reciprocal of the period of the grooves becomes close to the cutoff frequency (expressed by the reciprocal of the light spot diameter) of a reading optical system, and thus it is difficult to detect the positional shift of the light spot in the radial direction. This problem is the first problem.

The second problem is crosstalk that undesired information is leaked from the adjacent tracks. When the distance between the tracks is smaller than the light spot diameter, the light spot crosses part of the adjacent tracks so that undesired information is mixed into the necessary information of the target track even if the light spot just traces the center of the target track. In other words, the crosstalk increases.

To cope with these problems in the prior art, the JA-A-57-105828 proposes the following method. As shown in FIG. 3A, the disk surface is of "V-letter shape" or "inverted trapezoidal shape" in cross-section, and the light spot is moved along the slope of each groove to record thereon or reproduce therefrom information pits. In this method, the period of the grooves is the same as the distance between the grooves in the prior art, but the distance between the tracks in ½ that in the prior art. Thus, the tracking error can be detected, or the first problem can be solved. Moreover, since the information track surface is a slope, the distribution of the diffracted light is controlled by the control of the shape of the slope, so that only the diffracted light from the target information track 11 is distributed on the outer periphery of the exit pupil, with the effect of the cross-talk from the adjacent information track 12 or 13 being reduced, thus solving the second problem.

In addition, the JA-A-61-192047 proposed the following method. As shown in FIG. 3B, raised tracks 14 and recessed tracks 15 are alternately formed on the disk in a spiral shape or concentrically in the radial direction, and also a light guiding groove 16 is provided on each track. The optical guide groove 16 is smaller in width than the diameter of the recorded pits 17 and has (¼ to ⅛) $\lambda$ in depth where $\lambda$ is the wavelength of the laser light. The recording density on the disk of this structure is increased by the recording and reproduction on both raised tracks 14 and recessed tracks 15. Moreover, the light guiding grooves 16 on the tracks can be used for high-precision tracking control, thus reducing the cross-talk.

In addition, the JP-A-54-136303 proposes another method wherein, as shown in FIG. 3C, information tracks 20 to 23 of pits 18 and 19 which are $\lambda/4$ and $\lambda/8$ deep, respectively are arranged on the disk surface 3 in the radial direction. The distribution of the diffracted light is controlled by making the depths of the adjacent information pits different. That is, upon reproduction of the information tracks 20, 22 of $\lambda/8$ in depth, the difference between the signals from the light receiving surfaces of the two-divided photodetector is detected as a reproduced signal, and upon reproduction of the information tracks 21, 23 $\lambda/4$ deep, the sum of the signals therefrom is detected as the reproduced signal, thus reducing the cross-talk.

In the proposed method in the JP-A-57-105828 (FIG. 3A), the master disk having grooves of the "V-shape" or "inverted trapezoidal shape" in cross-section is produced by mechanical cutting of a metal plate with a diamond stylus of which the tip has a "V-shape" or "trapezoidal shape". In order to polish the sloped surfaces of the grooves on which the recorded pits are to be formed, up to a high-precision mirror-like finish, it is necessary to use the usual cutting system for fine patterns, or a laser cutting process in which laser light is irradiated on the surface that is coated with a resist sensitive to an ultraviolet ray (a photoresist), and the exposed areas are developed to form grooves. However, it is difficult to produces the above master disk by use of this laser cutting process.

In the proposed method in the JP-A-61-192047 (FIG. 3B), to polish the raised and recessed surfaces of grooves on which pits are to be recorded, the mechanical cutting process must be used as in the above prior art. Moreover, when the light guiding groove 16 is formed in each track, the reading of the information pits is greatly affected by noise from the light guiding grooves.

In the JP-A-54-13603 (FIG. 3C), the information pits on the adjacent tracks must have different depths. This is possible in such media as "read-only optical disk" in which information pits are formed in advance by a high-precision process control, for example, the laser cutting apparatus or the like. However, in such media as "optical disks for data file" in which information pits are recorded, reproduced and erased by a simple apparatus on the user's side, it is practically difficult to precisely record pits of different target depths on every track.

SUMMARY OF THE INVENTION

It is an object of the invention to provide a recording medium in which the recording density can be increased by decreasing the intertrack spacing as compared with the light spot diameter, while the tracking control is stably made, and a method and apparatus for the reproduction thereof.

It is another object of the invention to provide an optical recording medium which can be easily produced as a disk master not only by the mechanical cutting but also by the laser cutting and in which the intertrack distance can be reduced to about half the diameter of the irradiated recording light spot, and the recording density can be increased to about twice that in the prior art, and a method and apparatus for the reproduction thereof.

The optical recording medium of this invention is capable of recording information thereon by utilizing the local change of its characteristic due to the irradiation of a light spot to the medium. On this optical medium, are periodically formed grooves which extend in the direction of the reproduction movement of the recording medium and arranged perpendicularly to this direction (radially), and of which every two adjacent grooves have, respectively, different depths and are scanned at a time by a light spot for reproduction. The information pits are recorded on the flat surface between the grooves.

According to one feature of this invention, the different optical depth (which optical depth corresponds to the refractive index of the transparent substrate multiplexed by the physical depth when light is passed through the transparent substrate) of the grooves are respectively, $\lambda/8$ and $3\lambda/8$, where $\lambda$ is the wavelength of the light to be irradiated on the medium.

According to another feature of this invention, the different depths of the grooves are, respectively, $\lambda/8$ and $2.5\lambda/8$.

According to a method for the reproduction of the medium, a light spot is directed on the optical recording medium, and of the resulting distribution of reflected and diffracted light, the interference regions of 0-th order and third order on the shallow groove side are detected in the change of strength to thereby reproduce the information.

Moreover, of the distribution of reflected and diffracted light, the two interference regions of 0-th order and ± third-order are detected in the change of strength, and the position of the light spot is detected by the difference signal or the sum signal. The reflected and diffracted light distribution is obtained on a photo-detector, and the detection surface of the detector is divided into two parts for detecting the interference regions of 0-th order and third-order on the shallow groove side. The signals detected by the two parts are switched in accordance with the position of the light spot.

According to this invention, since two adjacent grooves fall within each light spot, the track pitch increases to twice that in the prior art. Moreover, since the information pits of data are recorded on the flat surface between the grooves, the spot control such as the focal servo can be stably made, and noise upon reproduction is small. In addition, the depth of the grooves is the optimum value, and when the optical depths of the grooves are substantially $\lambda/8$, and $3\lambda/8$, the total amount of received light is large. Thus, a signal of a high S/N ratio can be detected even from the recorded film of a large disk-noise. When the depths of the grooves are $\lambda/8$ and $2.5\lambda/8$, the cross-talk can be reduced even on the recorded film in which the information pits are so large as to protrude into the grooves because the change of the diffracted light due to the local characteristic change within the groove appears in only part of the received light distribution.

In the reproduction method according to this invention, the cross-talk can be reduced in the interference region of 0-th order and third-order diffracted light on the shallow groove side of the received light distribution obtained when the light spot is directed on the surface between the grooves because the diffracted light from the information pits on the adjacent tracks are cancelled out. Also, even if two grooves which have different depths are included in the light spot, the difference between the grooves can discriminatively be detected, and thus the tracking signal can be correctly detected even under the two-fold track pitch. In addition, if the light intensity on the received light distribution is detected for the discrimination of the shallow grooves, and the detected signals are switched so that the light intensity change on the shallow groove side is always detected as the information signal, the information signal with a small cross-talk can always be detected even when the shallow grooves are changed in the position between left and right each time the light spot makes a round because double grooves of different depths are spirally formed on the disk.

Thus, according to this invention, the tracking signal can be detected, a signal with small cross-talk can be detected, and the track pitch can be doubled so that the recording density can be doubled as compared with the conventional one.

BRIEF DESCRIPTION OF THE DRAWINGS

FIG. 4 shows the tables of expressions for analyzing the intensity distribution on the light receiving surface of the detector in this invention.

FIG. 6 shows the relation between the depth of grooves and the signal.

FIG. 7 shows the relation between the width of grooves and the signal.

FIG. 14 shows one example of the disk having the double spiral structure according to this invention.

FIGS. 15A and 15B are a schematical block diagram of a disk master according to this invention and a diagram useful for explaining the operation thereof.

DESCRIPTION OF THE PREFERRED EMBODIMENTS

Before the description of one embodiment of the invention, the problem to be solved by this invention and the principle therefor will be mentioned in detail with reference to the accompanying drawings.

Figure 2:
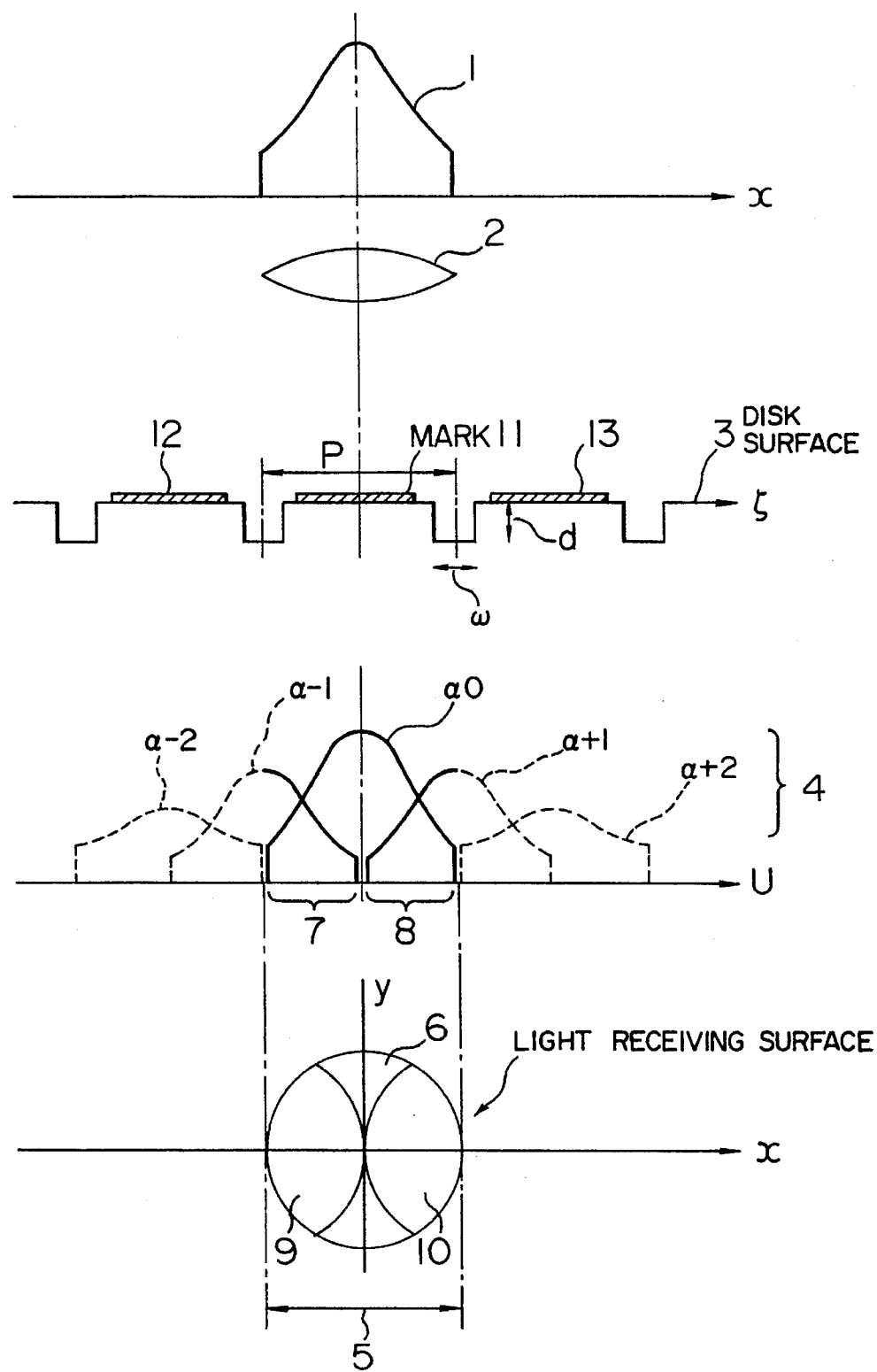
FIG. 2 is a diagram useful for explaining a conventional disk and a method of detecting the data from the disk.
Figure 3A:
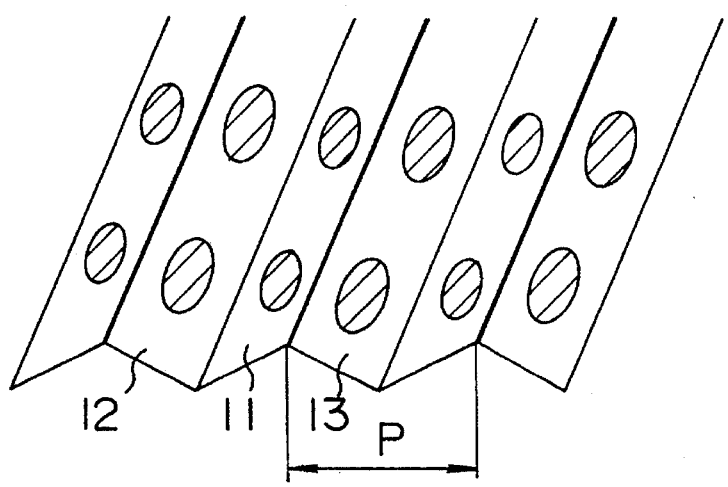
FIG. 3 shows the conventional means for reducing the cross-talk.
Figure 3B:
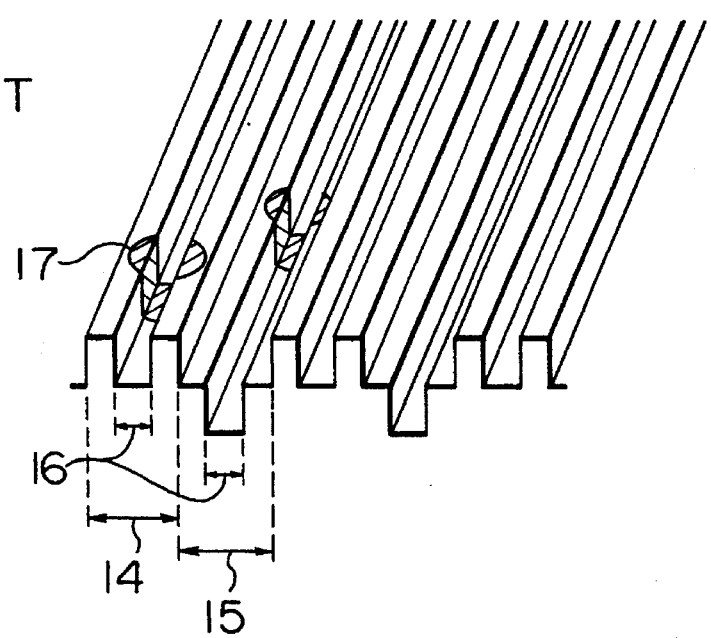
Figure 3C:
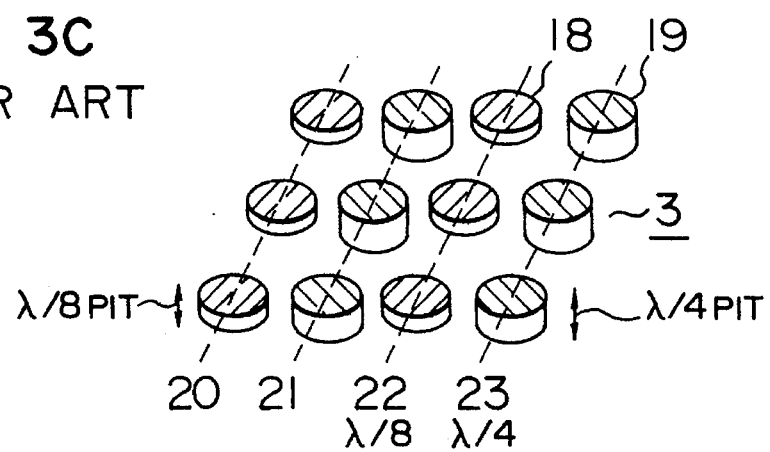

Referring to FIG. 2, a parallel light beam 1 with a Gaussian distribution is incident to a focusing lens 2 by which the beam is focused on a disk surface 3 as a light spot. The light spot undergoes the diffraction effect on the disk surface. The resulting diffracted light 4 from the disk surface is again passed through the focusing lens 2 to a photodetector 5 which is provided on the exit pupil surface. The reflected light intensity distribution on the photodetector 5 will be described below.

For the convenience of explanation, the distribution is shown only in a one-dimensional direction, or in the radial direction of the disk, necessary for the description of the invention.

On the surface of the focusing lens 2, the x-axis is taken in the radial direction of the disk.

The Gaussian distribution $\tau(x)$ of the light beam 1 incident to the focusing lens 2 is given as $$\tau(x) = \exp(-\delta/2 \cdot x^2) \qquad (1)$$

where $\delta$ is the intensity ratio between the center and the end on the intensity distribution, and the beam expansion radius, or the radius of the light spot is proportional to $\lambda/NA$.

Moreover, when the focusing lens 2 has no shift of focal point and no aberration, the light beam distribution $f(x)$ on the exit pupil of the lens 2 coincides with $\tau(x)$. This light beam $f(x)$ is subjected to Fourier transformation in the lens 2 so that it is focused on the disk surface 3. If u-axis is taken in the disk radius direction on the disk surface, the complex amplitude distribution $F(u)$ is expressed as $$F(u) = \int_{-\infty}^{+\infty} f(x) \exp(i2\pi ux) dx \qquad (2)$$

In other words, the light distribution $F(u)$ is diffracted on the disk surface 3. The effect of the diffraction can be expressed by the product $F(u) \cdot R(u)$ of the light distribution $F(u)$ and the complex reflection coefficient $R(u)$ on the disk surface 3. The complex reflection coefficient $R(u)$ is given as $$R(u) = r(u) \exp\{i\psi(u)\} \qquad (3)$$

where $r(u)$ is the actual reflection coefficient distribution, and $\psi(u)$ is the phase shape of the disk. If the vertical undulations on the disk surface 3 is represented by $d(u)$, for the reflection type, $\psi(u)$ is given as $$\psi(u) = 4\pi n d(u)/\lambda \qquad (4)$$

where n is the refractive index of the disk base and $\lambda$ is the wavelength of the light source. The coordinates u is obtained by the conversion, $u = (NA/\lambda) \delta$ for the agreement with the coordinate x on the pupil with respect to the actual coordinates $\delta$ on the disk surface 3, where NA is the aperture number of the focusing lens.

The complex amplitude distribution $F(u) \cdot R(u)$ of the reflected light from the disk surface is again passed through the focusing lens to the exit pupil, or photodetector 5. The complex amplitude distribution $\alpha(x)$ of the received reflected light is given by the reverse Fourier transformation.

$$(\alpha(x) = \int_{-\infty}^{+\infty} F(u)R(u) \exp(-i2\pi ux) du \qquad (5)$$

The above equations are derived by the Fourier transformation. When the complex reflective index $R(u)$ on the disk surface 3 has periodicity in the u-axis direction, the Fourier expansion is possible. As shown in FIG. 2, if the period of the complex reflective index $R(u)$ on the u-axis is represented by p, the complex reflective index $R(u)$ is expressed as $$R(u) = \sum_{m=-\infty}^{+\infty} Rm \cdot \exp\{i2\pi(m/p)u\} \qquad (6)$$

where m is an integer, and Rm is the m-order Fourier coefficient.

The Fourier coefficient Rm is expressed as $$Rm = 1/p \int_{-\infty}^{+\infty} R(u) \cdot \exp\{-i2\pi(m/p)u\} du \qquad (7)$$

The complex amplitude distribution $\alpha(x)$ of the reflected light within the exit pupil 5 is obtained by use of Eq. (7) as $$\alpha(x) = \sum_{m=-\infty}^{+\infty} \exp\{-i2\pi(m/p)u\} \cdot Rm \cdot f(x - m/p) \qquad (8)$$

In other words, it is given by the sum of the respective-order diffracted light distributions. When u=0, or when the light spot lies on the origin, the distribution of the m-order diffracted light am has the center at m/p, the spread of ±1 at the center and the Fourier coefficient Rm as the complex amplitude as is obvious from Eq. (8). As a result, the diffracted light indicated by the broken lines out of the exit pupil is not received by the receiving surface 6 opposite to the exit pupil because the high-order diffracted light has its center deviated from the origin. In FIG. 2, only the light receiving surface 6 is expressed in two dimensions. The exp term within Eq. (8) describes the change of the deviation of the light spot from the origin, or of the phase of the wave of the diffracted light relative to u.

The reflected light intensity distribution $I(x)$ on the light receiving surface 6 is determined as the result of the interference of each-order diffracted light included in the light receiving surface 5 which is given by Eq. (8). That is, it is expressed as $$I(x) = \alpha(x) \cdot \alpha^*(x) = \sum_{m=-\infty}^{+\infty} \sum_{m'=-\infty}^{+\infty} \exp[-i2\pi\{(m - m')/p\}u] \cdot R(m)R^*(m') \cdot f(x - m/p) \cdot f^*(x - (m'/p)) \qquad (9)$$

where the suffix * indicates conjugate complex.

The amount of received light, I actually detected on the photodetector 5 is given by the integration of the reflection intensity distribution on the receiving surface. If the light receiving surface 6 is divided, the amount of received light, I' on the divided light receiving region D is given as $$\Gamma = \int_D I(x)dx \qquad (10)$$

The problems in the prior art will be described by use of the above equations.

The disk surface 3 of the conventional optical disk for data file has grooves of a constant depth d and a width w formed at equal intervals in the radial direction of the disk as shown in FIG. 2. If, as an example, the wavelength $\lambda=0.83$ μm, the aperture number of focusing lens 2, NA=0.5, d=$\lambda$/8, w=0.4 μm, and p=1.6 μm, the light spot diameter w focused on the disk surface 3 is substantially expressed by $\lambda$/NA=1.6 μm. At this time, the m-order diffracted light distribution $\alpha$m which is determined by Eq. (8) is as shown in FIG. 2. In other words, only the 0-order diffracted light $\alpha$o and part of ±1-order diffracted light $\alpha_{+1}$, $\alpha_{-1}$ are reflected back to the exit pupil surface 5, or the receiving surface 6. The reflection intensity distribution I(x), as is obvious from Eq. (9), is changed only in the exp term together with the deviation of the light spot in the u-axis direction, or in the radial direction. Thus, only the 0-order diffracted light $\alpha$o and ±1-order diffracted light $\alpha$±1 contribute to the reflection intensity I(x). The exp term takes a finite value and changes with the value of u in the region 7, 8 where the 0-order and +1-order diffracted light or the 0-order and −1-order diffracted light are interfered with. Thus, the light receiving surface 6 is divided into light receiving surfaces 9, 10, and the reflected light intensity thereon is detected.

In this way, the deviation of the light spot in the radial direction of the disk, or the tracking error can be detected. Moreover, referring to FIG. 2, when the information pits are recorded between the grooves and reproduced therefrom, the reproduction of the information pits 11 on the target track is not affected by the leak of the reflected light from the information pits 12, 13 on the adjacent tracks, or the cross-talk therefrom because the distance between the tracks (track pitch) p is about the light spot diameter.

The decrease of the track pitch p for high density will be described. As is obvious from Eq. (8), the ±1-order diffracted light are shifted outward from the exit pupil 5 with the decrease of p. Thus, when the track pitch p is reduced to half the light spot diameter, or $\lambda$/(2NA), only the 0-order diffracted light $\alpha_o$ is present on the exit pupil 5, and the term within the { } of the exp term of Eq. (9) is zero, so that the tracking error cannot be detected. This is the first problem in the prior art. The second problem is that when the track pitch p is reduced to half the light spot diameter, about half of the information pit 12, 13 of the adjacent tracks is included in the light spot, thus increasing the cross-talk to cause error. Thus, in the conventional system having the above first and second problems, it is difficult to achieve the double-fold recording density by halving the track pitch.

The reason why these two problems can be solved by this invention will be described below. First, for the asymmetrical groove structure according to this invention, the diffracted light distribution $\alpha$ and the reflected light intensity distribution I(x) are determined, and it will be provided that the tracking error can be detected and that the cross-talk can be reduced.

Figure 1:
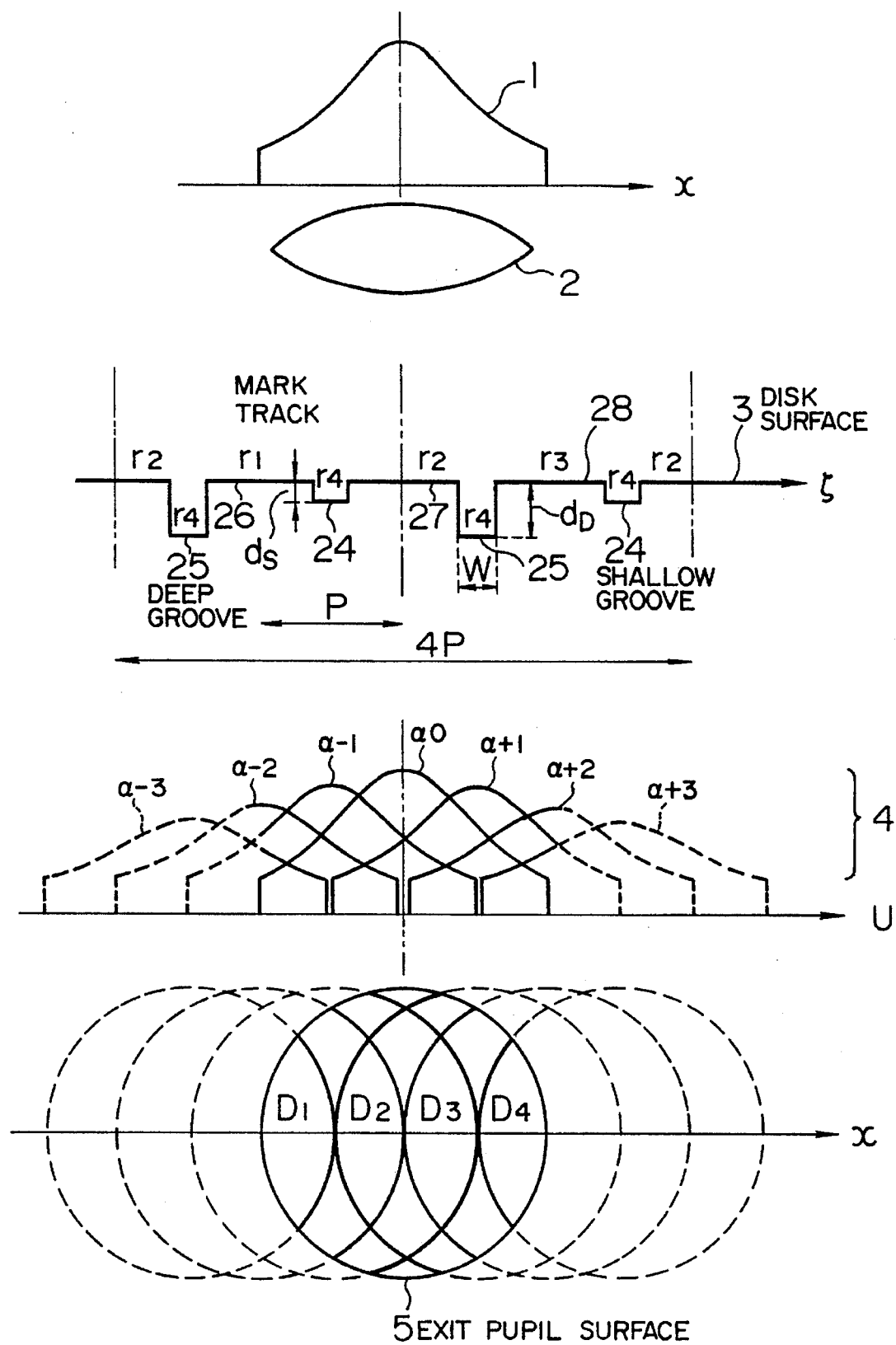
FIG. 1 is a diagram useful for explaining the principle of this invention.

As shown in FIG. 1, the disk surface has different-depth grooves, or shallow grooves 24 of physical depth $d_S$ and deep grooves 25 of physical depth $d_D$ ($d_D > d_S$) alternatively formed in the radial direction of the disk at intervals of P (P>W) where W is the width of the shallow and deep grooves and the shape of the grooves is a rectangle for simplicity. The light spot is irradiated on the center between the grooves so as to record or reproduce information, in which case, for considering the effect of the cross-talk, discrimination can be made between the respective regions of the disk which contribute to the diffracted light distribution $\alpha$. Thus, it is assumed that only the actual reflection index of the recording medium is changed by the formation of the information pits and that the actual reflection factors of the information tracks 26, 27 and 28 between the grooves and of the grooves themselves are represented by $r_1$, $r_2$, $r_3$ and $r_4$, respectively.

As a result, the length of the period on the disk surface 3 is 4p as the distance indicated between the two-dot chain lines, where p is the track pitch. On this surface structure having the period, is irradiated the light beam of the distribution expressed by Eq. (1) through the focusing lens 2, and the irradiated light beam is diffracted to produce respective-order diffracted light am on the exit pupil 5. The diffracted light can be determined by Eq. (8). When the distance P between the information tracks is half the light spot diameter, or P=$\lambda$/(2NA), the distance P is equal to 2, and the diffracted light up to the third-order of the m-order have their distributions on the exit pupil. FIG. 1 shows the distribution of the amplitudes of the respective-order diffracted light, or the m-order diffracted light distribution am obtained by normalizing the Fourier coefficient Rm by 1, and two-dimensional distribution.

The Fourier coefficient up to the third-order is derived from Eq. (7) by substituting $\gamma$=w/p, $\phi s$=4$\pi$ds/$\lambda$, $\phi D$=4$\pi$dD/$\lambda$, as $$R_o = (1 - \gamma)/4 \cdot (r_1 + 2r_2 + r_3) + (r_4/2)\gamma\{\exp(i\phi s) + \exp(i\phi D)\} \qquad (11)$$

$$R \pm 1 = \pm i/\pi \cdot \sin\{\pi/4(1 - \gamma)\}(r_1 - r_3) \qquad (12)$$

$$R \pm 2 = (r_2/\pi)\cos(\pi/2 \cdot \gamma) - 1/(2\pi) \cdot \cos(\pi/2 \cdot \gamma) \cdot \qquad (13)$$

$$(r_1 + r_2) \pm (i/\pi) r_4 \sin(\pi/2 \cdot \gamma) \cdot \{\exp(i\phi s) - \exp(i\phi D)\}$$

$$R \pm 3 = \mp i/(3\pi) \cdot \sin\{3\pi/4(1 - \gamma)\} \cdot (r_1 - r_3) \qquad (14)$$

The reason why the tracking error can be detected on the surface structure of the disk shown in FIG. 1 is that even when the distance p between the grooves is about half the light spot diameter, $\lambda$/(2NA), the distance between the shallow grooves 24 or deep grooves 25 is 2p, under which the diffracted light other than the 0-order one is included in the exit pupil 5 with the result that the reflection intensity distribution on the exit pupil is changed with the change of the deviation of the light spot from the track, or with the change of u, thus the deviation from the track being detected from this change. The substantial contribution to the change of the reflection intensity distribution with the change of u is the interference between the 0-order diffracted light and ± secondary-order diffracted light. The degree of the change is chiefly dependent on the contents within the third term { } of Eq. (13), or the difference between the depths of the shallow and deep grooves 24, 25.

The method for reducing the cross-talk will be described. The reflected light intensity distribution to be detected on the exit pupil 5 by the photodetector, as is obvious from Eq. (9), is the sum of the interferences of the respective-order diffracted light am determined by Eq. (8), and is also much affected by the distribution of the light beam 1 incident to the lens 2. Thus, if the exit pupil 5 is divided according to the region in which the respective-order diffracted lights am interfere, 4 different regions D1, D2, D3 and D4 shown in FIG. 1 are produced. Then, the amounts of reflected light are determined for the four respective regions and are expressed in the product of two actual reflection coefficients of $r_1$, $r_2$ and $r_3$, and $r_4$ of the regions on the disk surface 3 as listed on the column of FIGS. 4A and 4B. This is expressed as $$ID(i) = \sum_{m=-3}^{3} \sum_{m'=-3}^{3} A(i, m, m') \{k(1, m, m7) \cdot (r_2)^2 + \quad (15)$$

$$k(2, m, m') \cdot (r_2 \cdot r_4) + k(3, m, m') \cdot (r_1)^2 + k(4, m, m') \cdot (r_3)^2 +$$

$$k(5, m, m') \cdot (r_1 \, r_3) + k(6, m, m') \cdot (r_1 \, r_2) + k(7, m, m') \cdot (r_3 \, r_2) +$$

$$k(8, m, m') \cdot (r_1 \, r_4) + k(9, m, m') \cdot (r_3 \, r_4) + k(10, m, m') \cdot (r_4)^2\}$$

where D(i) is each light receiving region of I=1 to 4.

The respective coefficients k(1, m, m') to k(10, m, m') of the actual reflection factors in Eq. (15), when the distribution of the incident light beam is constant, indicate the interference intensity of the interference term (m, m') of the respective-order diffracted lights am included in the exit pupil 5 as shown in the rows of FIGS. 4A and 4B and determined by the groove width w, groove distance p, and groove depth $d_S$ and $d_D$. The proportional constants indicated on the four corners of the parentheses of the row are average values A(i, m, m') of the f(x−m/p)·f·(x−m'/p) in Eq. (9) and each region D(i) in the x-direction, normalized by the peak value of incident beam f(x) for each region D(i) on the exit pupil 5.

In Eq. (15), the signal component on the target track as the information track 27 from which information is reproduced and the cross-talk noise components leaked from the adjacent information tracks 26, 28 will be classified below. As will be obvious from Eq. (15), the first and second terms within the { } are the signal component, the third to ninth terms are the cross-talk noise components and the tenth term is the noise component. Moreover, as will be seen from FIGS. 4A and 4B, the first and third to seventh terms do not depend on the depth of the grooves, but depends on λ=W/P, or the ratio between the groove width W and the inter-groove distance P. The other second, eighth, ninth and tenth terms depend on the groove depth $d_S$, $d_D$ as well.

As a result of analyzing Eq. (15), the first term of the signal component can be increased by decreasing the groove width W and increasing the width of the information tracks, or decreasing λ. Meanwhile, the cross-talk components of the third to seventh terms much contribute to the regions D(2) and D(3) and are almost not included in the D(1) and D(4). This is because the change of the diffracted light distribution due to the change of actual reflection index $r_1$ or $r_3$ on the information track 26 or 28 is caused chiefly in the region of D(2) and D(3).

The second, eighth and tenth terms which much depend on the groove depth $d_S$, $d_D$ have reflection intensity distributions deviated to the D(1), D(2) side of the exit pupil 5 since the depths are different. The eighth and ninth terms of the cross-talk noise components can be optimized for the groove depth so that the value can be the minimum. Thus, the groove depths are optimized so that the cross-talk noise components are reduced as much as possible, that only the amount of reflected light ID(1) on the region D(1) is detected in order to increase the signal component, and that the cross-talk components in this region, or the eighth and ninth terms are minimized, thus the signal component, or the second term being increased.

Figure 5B:
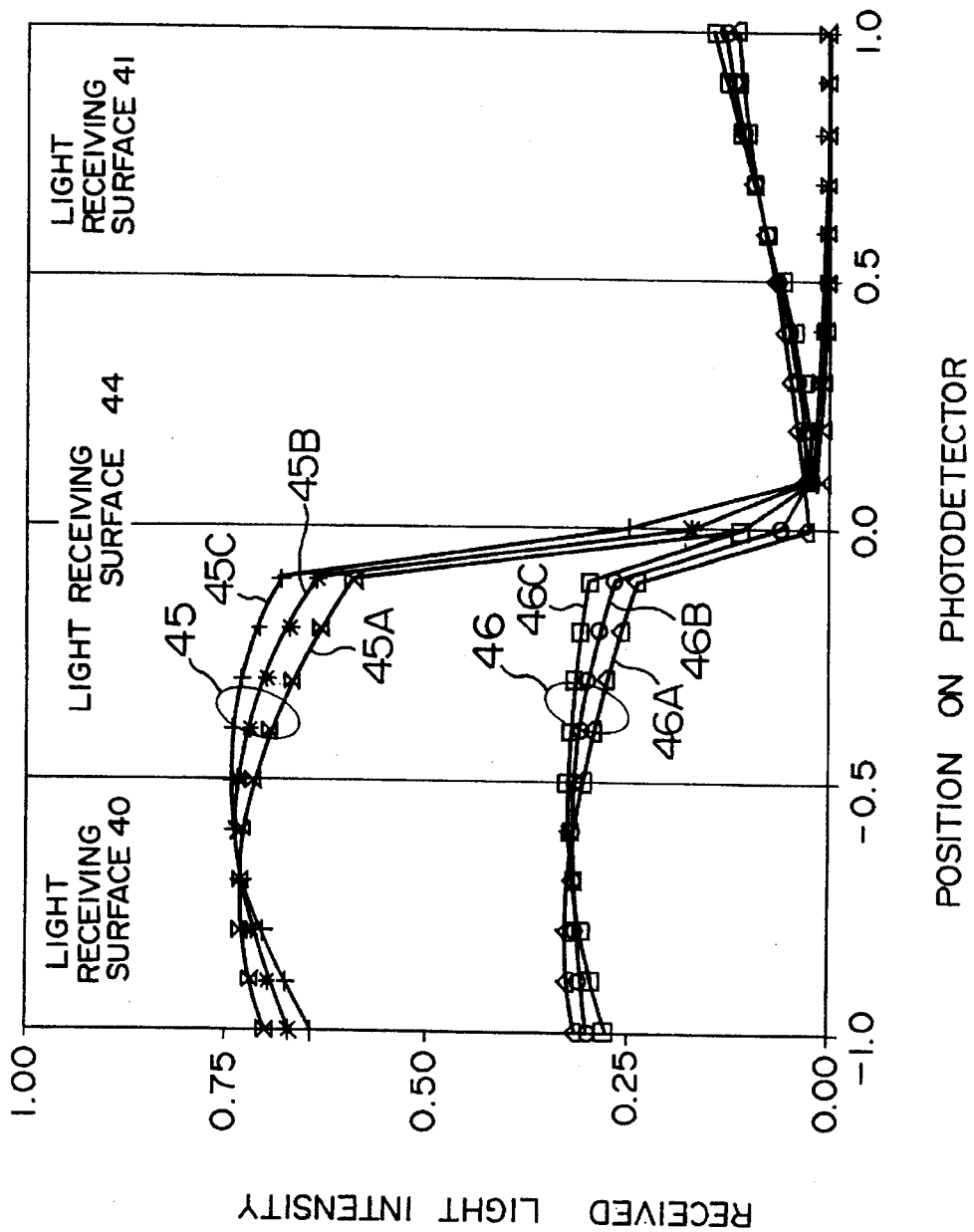
FIG. 5 is diagrams showing the structure of the disk in one embodiment of this invention and the received light distribution on the light detecting surface.

One embodiment of an optical disk of the invention will be described with reference to FIGS. 5A and 5B. FIG. 5A shows the disk surface structure. A recording thin film 30 is deposited on a disk base 29 which is optically transparent to the wavelength of light from the light source for recording and reproduction. In this embodiment, the recording film 30 is irradiated with the light from the light source so that its irradiated portion is melted or evaporated, thus exposing the disk base thereunder to the outside. Thus, the irradiated portions are changed in their effective reflection factors, or record information pits. In other words, the recording film used in this embodiment is, for example, a PbTe Se-base recording film as one of the so-called ablative-type recording media. On the disk surface 3, are alternately formed in the radial direction ξ of the disk the shallow grooves 24 and deep grooves 25 of a square-shape in cross-section similar to those shown by the principle diagram of FIG. 1. Each round of the flat surface information track 26, 27 or 28 between the grooves is divided into several tens of sectors 31 as units of information control regions. Each sector further includes a preformat portion 32 and a data portion 33. The preformat portion 32 is formed of information such as address indicative of the position of the sector on the disk, and is provided as a region on the disk upon production of the disk.

Figure 11:
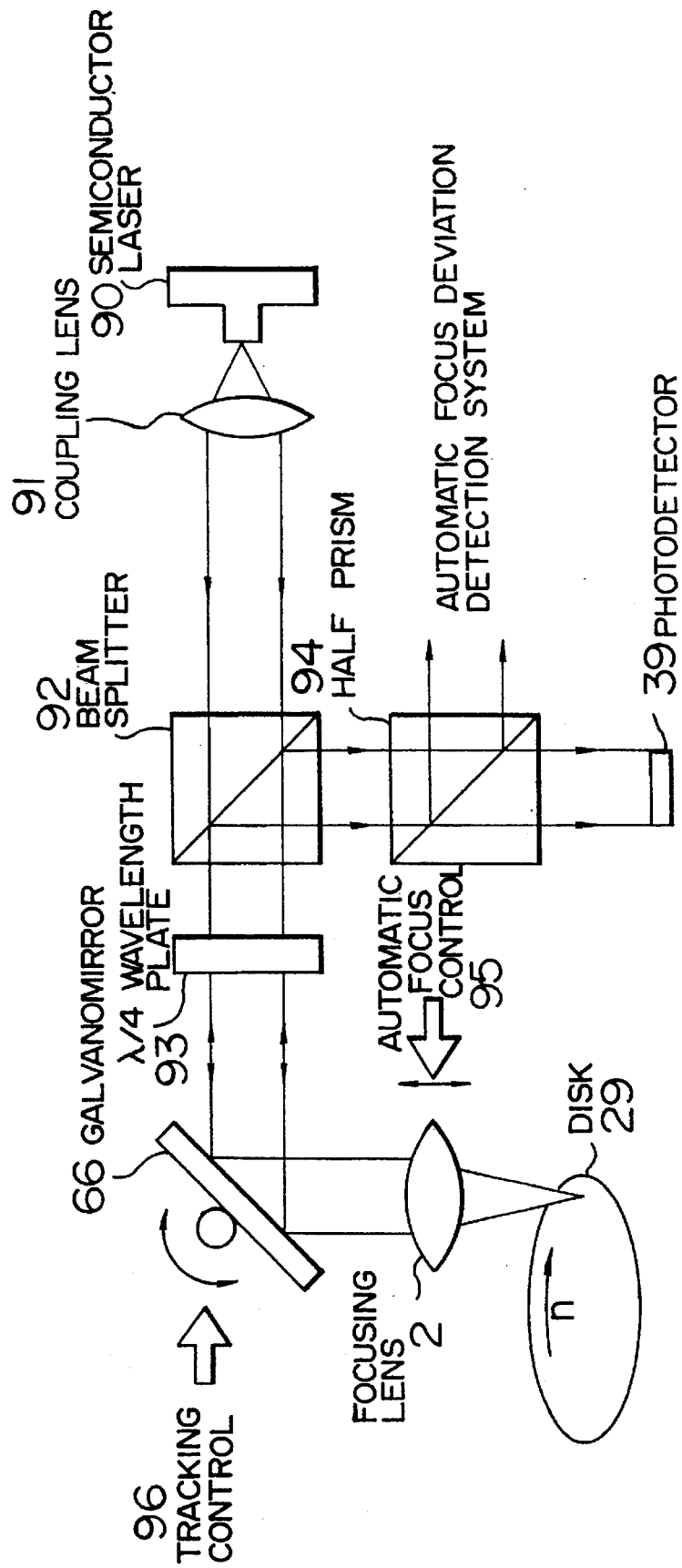
FIG. 11 shows one example of the optical system to be used in this invention.

This preformat region has a train 34 of phase pits of λ/8 in depth or a train 35 of phase pits of λ/4 in depth. The trains 34 and 35 of the phase pits are alternately arranged in the radial direction of the disk. The preformat region 32, however, has no groove structure. The process for producing the preformat portion 32, shallow grooves 24 and deep grooves 25 will be described later as the disk master producing process. On the other hand, the data portion 33 is the region in which information is recorded by the user. This region is formed of a train of information pits 36, 37 or 38. As in this embodiment, the information pits in the ablative-type recording medium having the thickness of about the wavelength λ from the light source, divided by several tens, are the regions in which the effective reflection factors are locally increased by the light irradiation. The optical system for use in recording and reproduction of information is a general optical pickup except a data reproducing detector 39 as shown in FIG. 11. This optical system includes at least, a light source 90, a coupling lens 91, a beam splitter 92, λ/4 plate 93 and half prism 94 and is provided with an automatic focus detecting system 95 and a tracking control system 96. As shown in FIG. 5A, the light beam from the light source is servo controlled by the automatic focus detecting system so that it is passed through the disk base 29 and focused on the recording film 30 of the disk 3 by the focus lens 2. Upon reproduction of data, the reflected light from the disk surface 3 is again passed through the focus lens 2 and led to a different direction from the light source by a beam splitter or the like. Thus, the photodetector 39 is disposed on the exit pupil surface 5 and has light receiving surfaces 40 and 41, and further 42, 43, 44 provided. The light receiving surfaces 40 and 41 correspond to the region D(1) or D(4) shown in FIG. 1, and the light receiving surface 44 includes regions D(2) and D(3). As shown in FIG. 5A, when the information track 27 is reproduced, the signal on the data portion 33 is detected by the light receiving surface 40 on the shallow groove side.

Description will be made of the effect of the optimization of the groove shape for reducing the crosstalk from the information pits on the adjacent tracks and the low-crosstalk reproduction of information form the information pits relative to the optimized shape. First, the effect of the optimization of the groove shape under the conditions of the wavelength of light source, λ=0.83 μm, aperture number NA=0.5 of the focus lens, and track pitch p=0.8 μm will be mentioned with reference to FIGS. 6 and 7. FIG. 6 is a diagram for determining the optimization of the groove depth. The groove depth $d_S$ of the shallow groove 24, for the convenience of analyzation, is selected to be λ/8n (n is the refractive index of the disc base 29). In FIG. 6, the depth $d_D$ of the deep groove 29 is normalized so that λ/n is 1 and taken on the abscissa. On the ordinate is taken the value of the second and eighth to tenth terms which depend on the depth, of the terms of the reflected light amount intensity ID(1) on the region D(1) determined by Eq. (15), and the amount of the signal component except the cross-talk component of the first term, or the total amount of light of the first, second and tenth terms for reference. From FIGS. 6 and 7, it will be obvious that the depth $d_D$ of the groove at the minimum of the eighth and ninth terms of cross-talk components is in the range of 2.5 $\lambda/8n \leq d_D \leq 3$ $\lambda/8n$. Moreover, in order for the second term of signal component to be as large as possible, it is desired to satisfy $d_D \approx 3$ $\lambda/8n$.

Since the total amount of light can be increased under the above value, a high S/N signal can be detected even on the recording film with large disk noise. The above optimization can be made as long as the information pit is within the shallow groove 24 or deep groove 25. In this case, the thermal recording medium is desired to have such a thermal characteristic that heat is difficult to escape in the width direction. For example, there are a phase change type recording medium utilizing the fact that the reflection factor of the chalcogenide-based recording medium with a small thermal diffusivity is changed between the crystallized and noncrystallized states, and an ablative type recording medium of the same chalcogenide-based material of which the reflection factor can be changed by removing the recording medium by fusing or evaporation. On the other hand, in the metal film with a large thermal diffusivity, for example, an optical magnetic recording film, the pit width is easy to extend because heat becomes obviously easy to escape. If as shown in FIG. 5A, the information pits 36, 37, 38 have so large diameters as to project into the groove, the second term includes not only the signal component but also the cross-talk component, and the fourth term includes the signal component and the cross-talk component in addition to the noise component. For an example of optimization, the second and tenth terms are considered as the cross-talk component and the depth $d_D$ of the deep groove 25 is determined so that the value is as small as possible. From FIG. 6, it will be obvious that the optimum depth $d_D$ is $d_Dn=2.5$ $\lambda/8n$. The total amount of light under the above value is smaller than under $d_D \approx 3$ $\lambda/8n$, but the first term of the signal component is not dependent on $d_D$ but takes constant. Thus, the set value is advantageous for the recording film with a small disk noise.

The optimization of the groove width w is shown in FIG. 7. The abscissa indicates the ratio, $\gamma(w/p)$ of the groove width w to the groove pitch p, and the ordinate indicates the values of the first term to the tenth term. In order for the cross-talk component to be as small as possible, $\gamma$ should be in the range, $0.35 \leq \gamma \leq 0.5$, or $p=0.8$ μm, groove width w, 0.3 $\mu m \leq w \leq 0$ at the minimum of the eighth or ninth term of the cross-talk component. This range of the values can be realized by the groove forming technique used in the master disk producing process which will be described later.

The sizes of the grooves for optimization are as follows.

For the depth $d_D=\lambda/8n$ of the shallow groove 24, [Case 1] the depth of the deep groove 25, $d_D=3$ $\lambda/8n$ [Case 2] the depth of the deep groove 25, $d_D=2.5$ $\lambda/8n$ groove width w=0.3 μm to 0.4 μm The experimental results for the cross-talk reduction effect under these sizes will be mentioned. FIG. 5B shows the measured results of the reflection intensity distribution of the light received by the optical detector 39 in the radial direction ξ of the disk. The abscissa indicates the distance from the center, normalized by the radius of the received surface, and the ordinate indicates the amount of light received. In FIG. 5A, when the light spot is at point A, 8 combinations are observed of the presence or absence of the three information pits 36, 37, 38 each having pit diameter φ=0.6 μm. This distribution is measured for the [case 1]. For the [case 2], the same distribution can be obtained. The distribution curve group 45 is the distribution in the absence of information pit 37, and the distribution curve group 46 is the distribution in the presence of information pit 37. Here, FIG. 5B will be described more detail as follows:

45; the distribution curve groove for the case in which the mark 37 is not present on the target track 27, 45A; for the case in which the marks 36, 37, 38 are not present, 45B; for the case in which data (mark 36 or 38) is present on the one-side adjacent track, 45C; for the case in which data (marks 36 and 38) are present on both-side adjacent tracks, 46; the distribution curve group in the case in which the mark 37 is present on the target track 27, 46A; for the case in which data (mark 37) is present only on the target track 27, 46B; for the case in which in addition to mark 37, a data (mark 36 or mark 38) is present on one-side adjacent track, 46C; for the case in which in addition to mark 37, data (marks 36 and 38) is present on both-side adjacent tracks.

Figure 8:
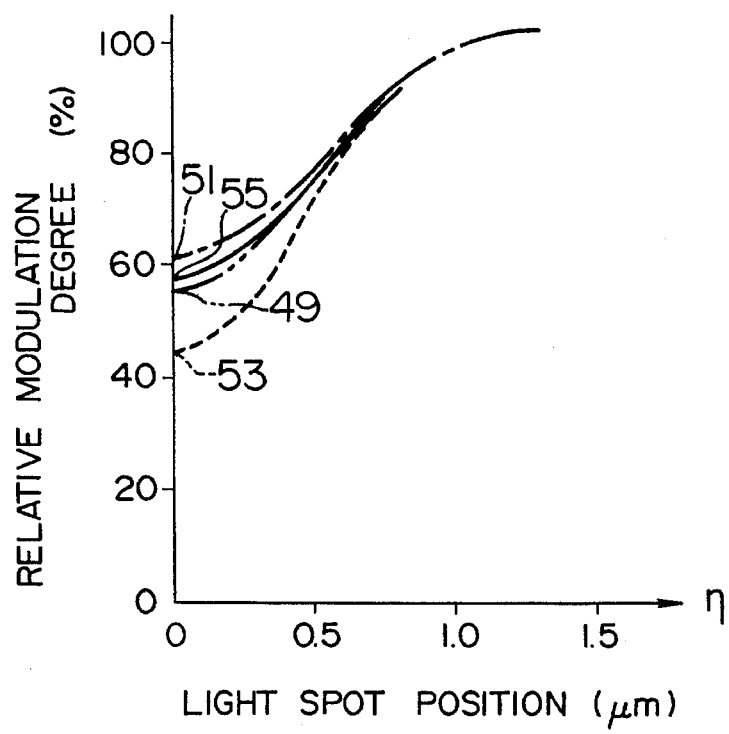
FIGS. 8 and 9 show the measured cross-talk noise on the disk structure of this invention.
Figure 9:
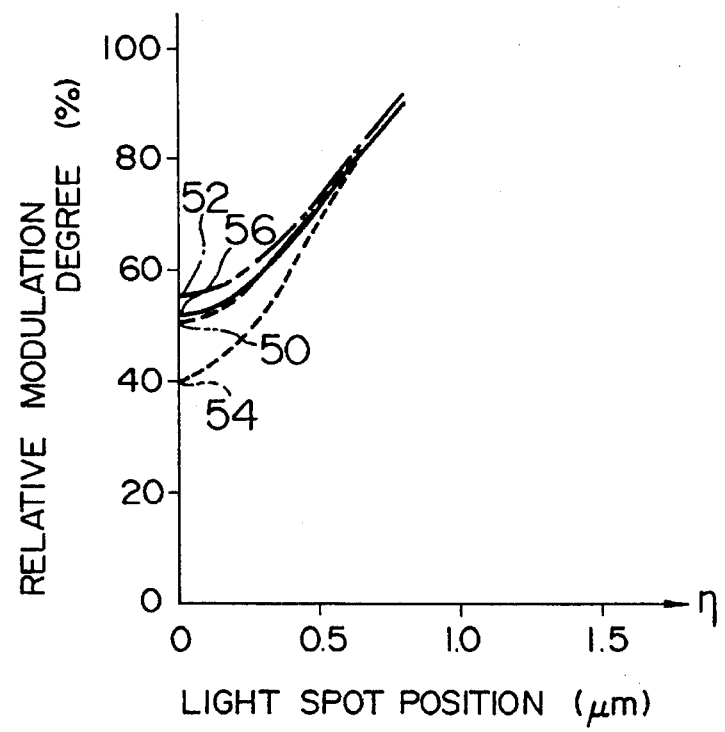

The effect of the cross-talk from the data of the adjacent tracks is the smaller, the smaller the deviation of 45B and 45C relative to 45A and the deviation of 46B and 46C relative to 46A. Thus, if light is received by the light receiving surface 40 and the light intensity on this region is integrated to form the signal output, the effect of the cross-talk can be reduced. As described in the means for optimization, if light is received only on the light receiving surface 40, the amount of received light is changed independently of the presence of the information pits 36 or 38 which cause the cross-talk, but only depending on the presence or absence of the information pits 37 for the signal component, and the amount of change is larger than on the other light receiving surfaces. FIGS. 8 and 9 show the quantitative measurements of the above effect for the [case 1] AND [case 2], respectively. In FIGS. 8 and 9, the abscissa indicates the position of the light spot in the track direction +η and the origin corresponds to point A. The ordinate indicates the relative modulation degree resulting from normalizing the amount of received light on the partial light receiving surface 40 or the entire light receiving surface 39 by the amount of received light P, T in the absence of the information pits 36, 37, 38. The amount of cross-talk is determined from the difference |C−S| between the modulation degree S at point A in the presence of only the information pits 37 and the modulation degree C at point A in the presence of the information pits 36, 37, 38, divided by the modulation degree S, or determined from |C−S|/S.

In FIGS. 8 and 9, the modulation degree on the entire light receiving surface 39 in the presence of only the information pits 37 is indicated by 49, 50, the modulation degree on the partial light receiving surface 40 by 51, 52, the modulation degree on the entire light receiving surface in the presence of the information pits 36, 37, 38 by 53, 54, and the modulation degree on the partial light receiving surface 40 by 55, 56. The amount of received light, P and the relative modulation degree T are given as follows.

| [Case 1] | |
|---|---|
| When light is received on the entire light receiving surface 39 | −13.1 dB (T = 47.5%) |
| When light is received on the partial light receiving surface 40 | −19.6 dB (P = 24.6%) |
| [Case 2] | |
| When light is received on the entire light receiving surface 39 | −13.8 dB (T = 32.0%) |
| When light is received on the partial light receiving surface 40 | −21.5 dB (P = 14.2%) |

From the above, it will be understood that the cross-talk noise is reduced by 6 dB or more by detecting the signal on the partial light receiving surface 40. Moreover, in [case 2], the amount of received light is halved as compared with that in [case 1], and the amount of cross-talk can be further reduced by 2 dB.

Figure 10:
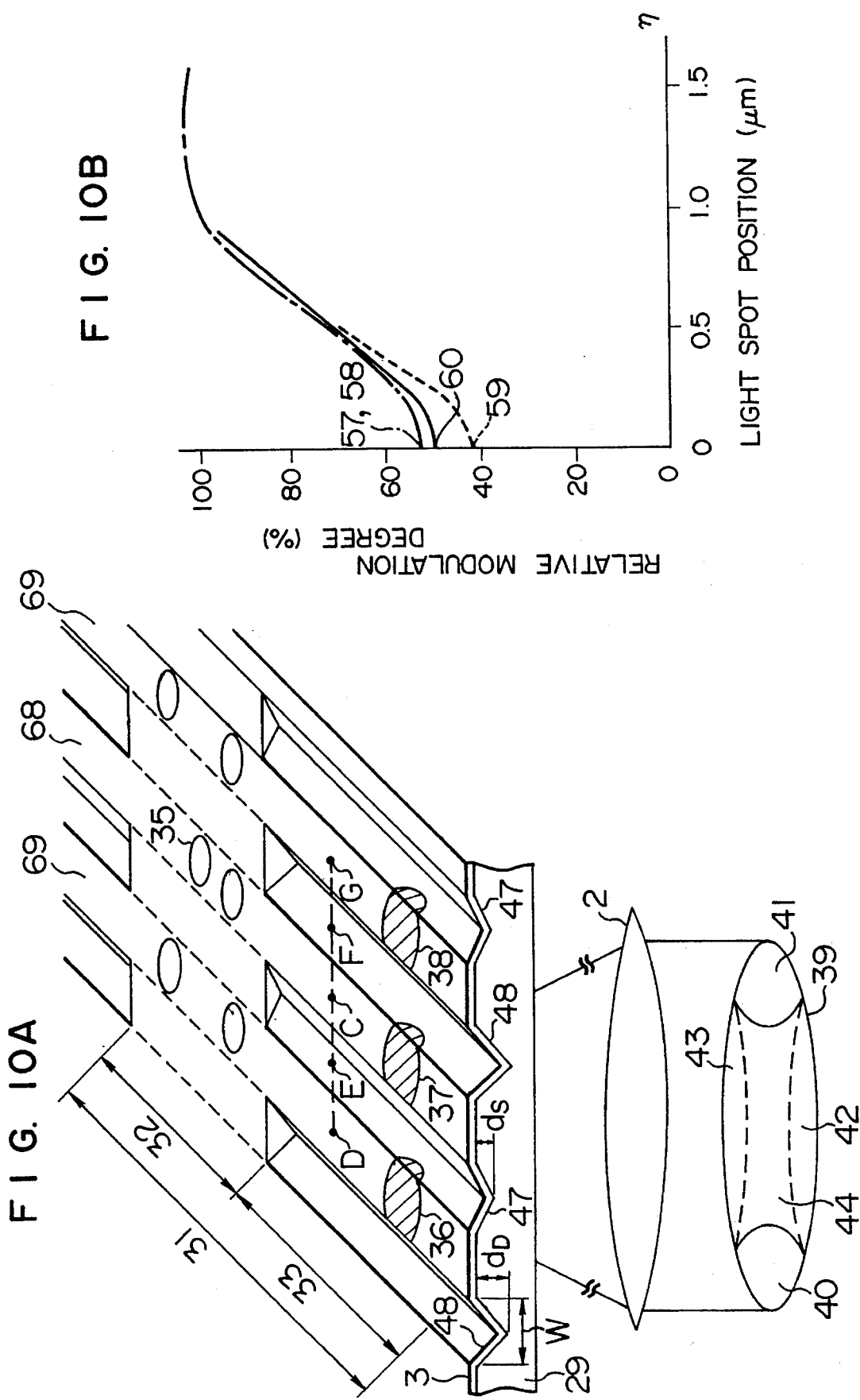
FIG. 10 shows the disk structure with V-letter shaped grooves and the cross-talk noise.

While in the above description the groove shape is a square shape, the cross-talk can also be reduced for the V-shaped groove. One example of the measured result is shown in FIG. 10B. FIG. 10A shows the surface structure of the disk, and FIG. 10B shows the effect of the reduction of the cross-talk for the shape shown in FIG. 10A.

As [case 3], the size of the groove is shown as follows.

The shallow groove depth $d_S = \lambda/8n$

The deep groove depth $d_D = 3\lambda/8n$

The groove width w is 0.4 μm for the shallow and deep grooves.

The amount of cross-talk noise is determined from FIG. 10B as follows.

| For the light received on the entire light receiving surface 39 | −13.6 dB (T = 44.0%) |
|---|---|
| For the light received on the partial light receiving surface 40 | −24.0 dB (P = 11.5%) |

In this case, the modulation degree on the entire light receiving surface 39 in the presence of only the information pits 37 is indicated by 57, the modulation degree on the partial light receiving surface 40 by 58, the degree on the entire light receiving surface in the presence of information pits 36, 37, 38 by 59, and the modulation on the partial light receiving surface 40 by 60. From the above results, the cross-talk noise can be reduced further by 2.5 dB.

By use of the groove shapes and partial light receiving surfaces of [case 1] to [case 3], it is possible to make reliable data reproduction with cross-talk noise of −20 dB or below.

From the detailed analysis of the distribution in FIG. 5B, it will be understood that the respective distribution curves intersect with each other on the light receiving surface 40. Also, the received cross-talk light intensity is reduced on the inner side of the exit pupil surface separated from the intersections but increased on the outer side thereof.

Therefore, the effect of the cross-talk can be reduced if the light near the intersections is received.

The method of reading the preformat portion 32 will be described. Upon reproduction of a train of prepits 34, the difference between amounts of received light from the light receiving surfaces 40 and 41 is used as the preformat reproduced signal, and upon reproduction of prepits 35, the sum thereof is used as the preformat reproduced signal, so that data such as address can be detected stably.

The tracking method for the disk structure in the [case 3] will be mentioned below.

Figure 12:
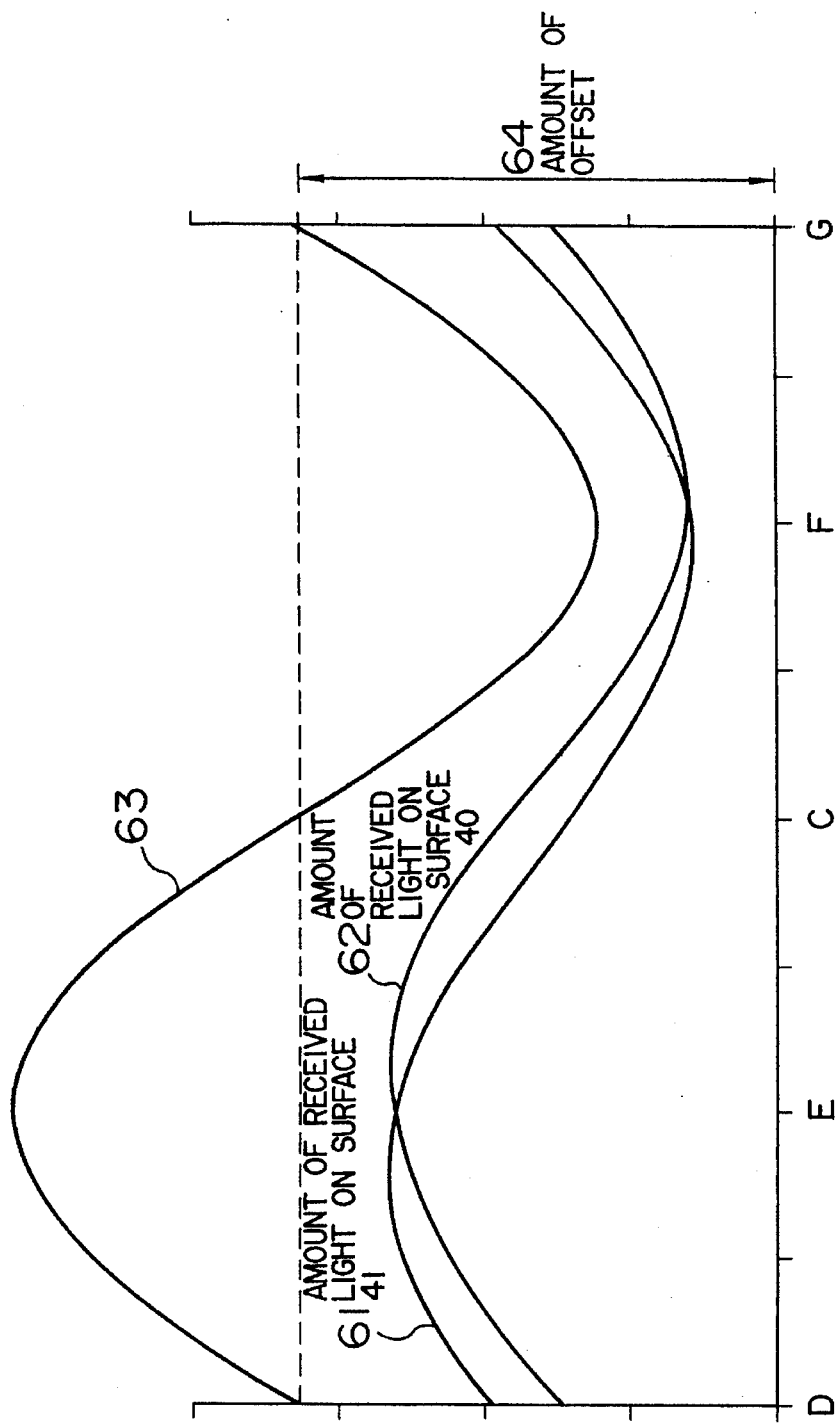
FIG. 12 is a diagram useful for explaining the principle of the tracking.

FIG. 12 shows the amounts of received light, 61, 62 and the sum thereof 63 on the light receiving surfaces 40, 41 in the radial direction of the disk when the light spot crosses the tracks as D→E→C→F→G. In order for the light spot to follow the target track C, the sum 63 is made equal to the amount of offset, 64. In other words, in the circuit arrangement shown in FIG. 13 the signal 65 resulting from the subtraction of the amount of offset 64 from the sum 63 is used as the tracking error by which a galvanomirror 66 shown in FIG. 11 is controlled. In this case, when the light spot is controlled to follow the track D or G, it is necessary to invert the polarity of the tracking error signal by a polarity inverting circuit 67 (see FIG. 13) as will be obvious from FIG. 12. Hereinafter, it is assumed that the track of which the shallow groove 47 is positioned on the light receiving surface 40 side is called an odd track 68, and that the track of the shallow track is positioned on the opposite side is called an even track 69.

Description will be made of the data detection method for the disk structure in which the shallow groove 47 and deep groove 48 are double-spirally formed as shown in FIG. 14.

Figure 13:
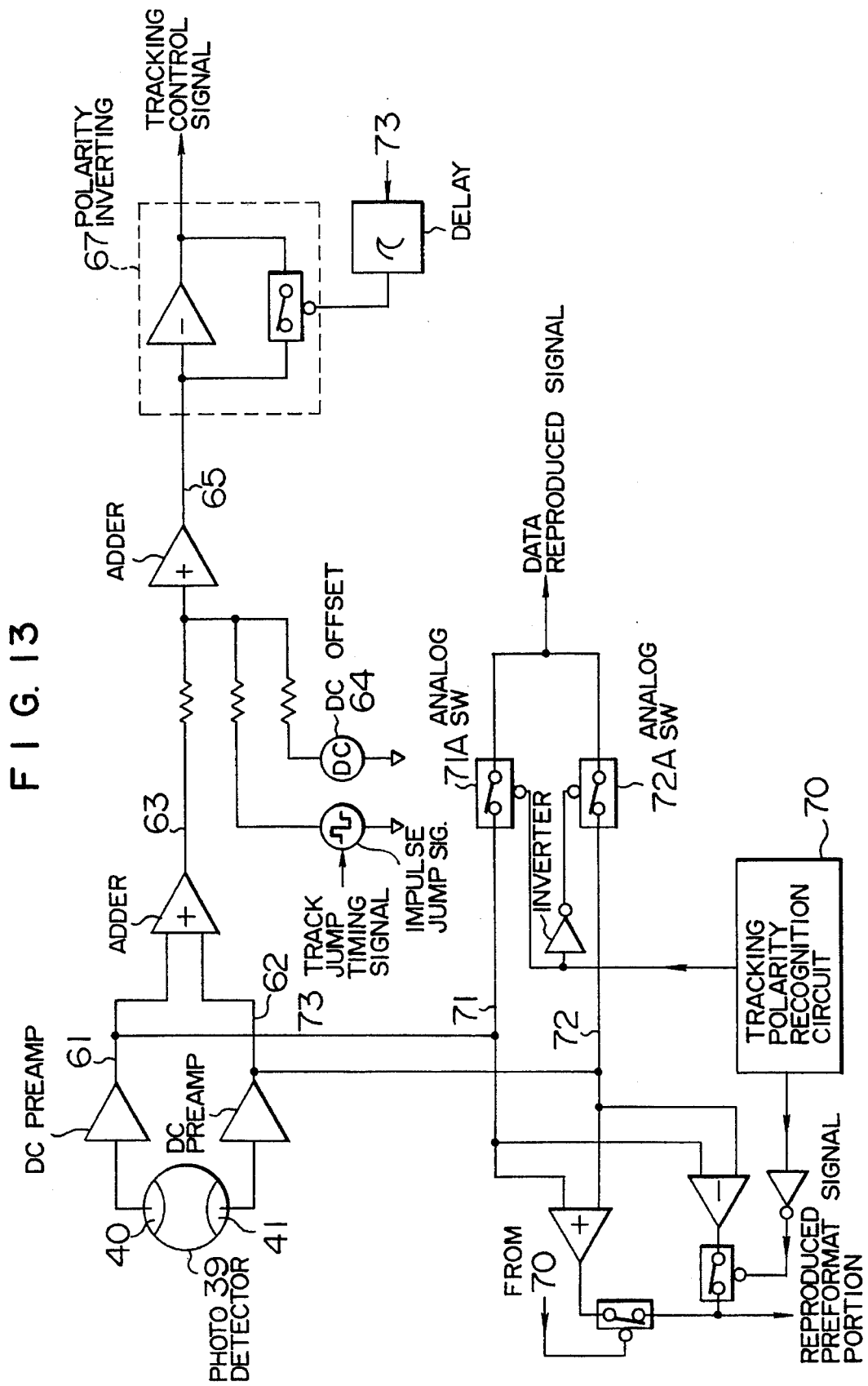
FIG. 13 shows a circuit arrangement for making the tracking control and detecting the reproduced signal.

First, a description will be made of a method of sequentially reading the odd track 68 and even track 69 which are alternately arranged in the radial direction of the disk. The timing signal for track jump is detected from the previously provided preformat portion 32 preformed on the disk. Here, an example will be explained of the case in which the light spot follows the odd track 68 and jumps to the adjacent even track 69 on the outer side as viewed from the radial direction. Before the jump the information signal is detected by use of the light receiving surface 40. Under this condition, the instant that the timing signal is detected after the disk has rotated once, the offset in the direction in which the light spot is jumped is, as shown in FIG. 13, added to the tracking signal so that the light spot is moved to the adjacent track. At this time, the light spot can be controlled to follow the adjacent even track 69 on the outer side by inverting the polarity of the tracking error signal. Then, a tracking error signal polarity recognition circuit 70 responds to the polarity of the tracking error signal to control analog switches 71A and 72A to stop a signal 71 from the light receiving surface 40 and select a signal 72 from the light receiving surface 41 as the reproduced signal, so that the light spot follows the even track. By repeating this operation, it is possible to sequentially read the tracks. The above operation is similarly made even for detecting the preformat reproduced signal as shown in FIG. 13.

Description will be made of the method for continuously reading the same track on the disk of the double spiral structure. When the light spot traces the odd track 68 as, for example, shown in FIG. 14, the light spot, after the disk has rotated once, jumps over one track to the outer odd track. Here, for continuously reading the same track, the offset of the impulse for the light spot to be returned to the inner side is added to the tracking error signal under the control of the timing signal 73 for the track jump after one revolution of the disk. In this case, there is no need to invert the polarity of the tracking error signal. By the above method, it is possible to continuously read the same track.

Figure 15A:
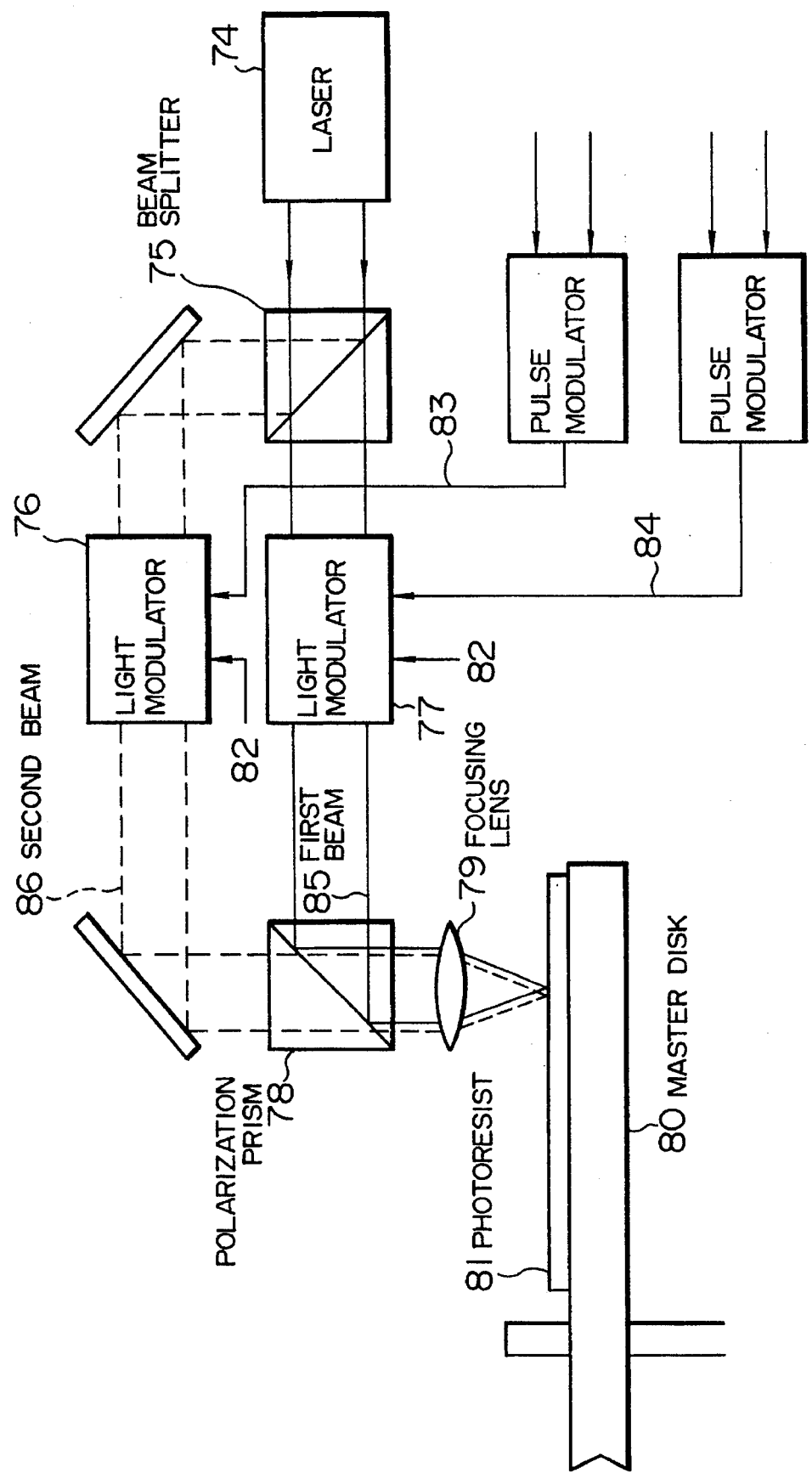

FIGS. 15A and 15B show an example of producing the disk master of the structure used in the embodiment by the laser cutting process. The laser beam from a laser 74 for the exposure is split by a beam splitter 75 into two beams, which, in order to be independently modulated and deflected, are supplied through light modulators 76 and 77, respectively and passed together through a polarization prism 78. These beams are further focused by a focusing lens 79 onto a photoresist 81 on a master disk 80. The light modulators 76, 77 are controlled by a deflection pulse signal 82 to deflect the light spot by the same amount in the radial direction, and also they are supplied with light modulating signals 83, 84, respectively so that the light beams are intensity-modulated in accordance with the modulating signals. The first beam 85 is used to expose the shallow groove 47 and $\lambda/8$ prepit train 34, and the second beam 86 is used to expose the deep groove 48 and 3 $\lambda/8$ prepit train 35. As shown in FIG. 15B, the beams are not deflected but intensity modulated for the respective target groove depths when the shallow groove 47 and deep groove 48 are exposed, and the intensity modulated beams are irradiated on the disc master. Then, for the preformat portions 32, the beams 85, 86 are deflected outward by applying the deflection pulse signal 82 to the light modulators, and modulated to expose the prepits 34, 35. In this embodiment, the track pitch p=0.8 μm, and the amount of deflection p=0.8 μm. The disk master is rotated and the two beams 85, 86 are fed at pitch 2p=1.6 μm in the radial direction, so that the double-spiral master disk shown in FIG. 14 can be produced.

While in the above embodiment the grooves are of a square-shape or V-shape, they may be of a U-shape or respectively of different shapes, in which case the same effect can be achieved. Moreover, the groove depth and width may be changed within the allowances.

According to this invention, the track pitch can be reduced of half that in the prior art, and the target value of the amount of cross-talk, or −20 dB or below which is normally necessary in the optical disk apparatus can be realized. Also, the storage capacity can be increased, while data can be recorded and reproduced with high reliability.

We claim:

1. An optical recording medium on which information is recorded by irradiating said medium with a light spot focused through a focusing lens to cause a local characteristic change therein and recorded information is reproduced by said light spot irradiation and detection of reflected light from the medium through said focusing lens, said optical recording medium including: groves formed in a same substantially horizontal surface of said medium extending substantially in parallel to a base surface of said medium, adjacent grooves having different optical depths from each other with respect to said same substantially horizontal surface and which extend in a direction in which said light spot is moved relative to said medium and which are alternately and periodically formed in a direction perpendicular to said relative movement direction of said light spot such that the adjacent grooves thereof can be simultaneously covered by said light spot; and recording regions provided on areas of said substantially horizontal surface which is a track center formed between said adjacent grooves.

2. An optical recording medium according to claim 1, wherein the different optical depths of said adjacent grooves are substantially $\lambda/8$ and 3 $\lambda/8$, respectively, where $\lambda$ is the wavelength of said light spot.

3. An optical recording medium according to claim 1, wherein the optical depths of said adjacent grooves are substantially $\lambda/8$ and 2.5 $\lambda/8$, respectively, where $\lambda$ is the wavelength of said light spot.

4. An optical recording medium according to claim 1, wherein said grooves of different optical depths include shallow grooves of, substantially, $\lambda/8$ in depth and deep grooves of, substantially, 2.5 $\lambda/8$ to 3 $\lambda/8$ in optical depth, where $\gamma$ is the wavelength of said light spot and the areas formed between said adjacent grooves on which information tracks are formed are arranged at a pitch substantially smaller than the diameter of said light spot.

5. An optical recording medium according to claim 1, wherein a width w of said different-depth grooves and a spacing p between the adjacent ones of said grooves are determined to satisfy a condition of $0.35 \leq \gamma \leq 0.5$, where $\gamma$ is the ratio between w and p.

6. An optical recording medium according to claim 1, wherein said adjacent different-depth grooves are formed substantially of a rectangular shape or a V-letter shape, and the substantially horizontal surface between said adjacent grooves on which information tracks are formed are arranged at a pitch of substantially half or below the diameter of said light spot.

7. A method of reproducing information recorded on an optical recording medium on which said information is recorded by irradiating said medium with a light spot focused through a focusing lens to cause a local characteristic change therein and recorded information is reproduced by said light spot irradiation and detection of reflected light from the medium through said focusing lens, said optical recording medium including: grooves formed in a substantially flat surface of said medium, adjacent grooves having different optical depths from each other and which extend in a direction in which said light spot is moved relative to said medium and which are alternately and periodically formed in a direction perpendicular to said relative movement direction of said light spot such that the adjacent grooves thereof can be covered by said light spot; and recording regions provided on areas of said substantially flat surface formed between said adjacent grooves; said method comprising the steps of:

obtaining a distribution of reflected and diffracted light including 0-order and third-order light from said medium by irradiating said medium with said light spot; and reproducing at least a signal corresponding to a mark indicative of recorded information from a change of light intensity on 0-order and ± third-order interference regions of said obtained reflected and diffracted light distribution formed in an exit pupil.

8. A method of reproducing information recording on a recording medium according to claim 7, wherein said reproducing step comprises detecting a first signal indicative of the intensity change of a 0-order and a + third-order interference region of said reflected and diffracted light distribution and a second signal indicative of the intensity change of the 0-order and − third-order interference region of said reflected and diffracted light distribution, and detecting the position of said light spot on the basis of the difference or sum of said first and second signals.

9. A method of reproducing information recorded on a recording medium according to claim 8, further comprising the steps of obtaining said reflected and diffracted light distribution on a photodetector having a detecting surface divided into two parts for detecting the 0-order and third-order interference regions, and switching said signals indicative of the intensity change of said interference regions detected from said divided detecting surface in accordance with the position of said light spot.

10. An information reproducing apparatus for reproducing information recorded on an optical recording medium on which said information is recorded as a mark by irradiating said medium with a light spot focused through a focusing lens to cause a local characteristic change therein and recorded information is reproduced by said light spot irradiation and detection of reflected light from the medium through said focusing lens, said optical recording medium including: grooves formed in a substantially flat surface of said medium, adjacent grooves having different optical depths from each other and which extend in a direction in which said light spot is moved relative to said medium and which are alternately and periodically formed in a direction perpendicular to said relative movement direction of said light spot such that the adjacent grooves thereof can be covered by said light spot; and recording regions provided on areas of said substantially flat surface formed between said adjacent grooves; said information reproducing apparatus comprising:

light irradiating means for irradiating said optical recording medium loaded in said apparatus with said light spot; and light detecting means for obtaining a distribution of the reflected and diffracted light including 0-order and third-order light from said optical recording medium in response to the irradiation by said light irradiating means; said light detecting means including means for detecting an intensity change of 0-order and third-order interference regions on a shallow groove's side of the obtained light distribution formed in an exit pupil, and information reading means for generating a signal corresponding to a mark indicative of information in accordance with the output of said intensity change means.

11. An information reproducing apparatus according to claim 10, further comprising spot position detecting means for detecting the intensity change of two 0-order and ± third-order interference regions of said distribution and detecting the position of said light spot on the basis of the difference or sum of the two detected intensity changes, photodetector means having its detection surface divided into two parts for detecting the 0-order and third-order interference regions on the shallow groove's side of said reflected and diffracted distribution, and tracking switching means for switching the signals detected on said detecting surfaces in accordance with the position of said light spot which is determined by said spot position detecting means.

12. A method of reproducing information recording on a recording medium according to claim 7, wherein said reproducing step comprises detecting a signal indicative of the intensity change of the 0-order and ± third-order interference regions on a shallow groove side of said obtained reflected and diffracted light distribution.

13. An optical recording medium according to claim 1, wherein the adjacent grooves having different optical depths from each other include one of the adjacent grooves having a shallow depth of a substantially constant depth and the other of the adjacent grooves having a deep depth of a substantially constant depth and of a substantially greater depth than the substantially constant depth of the shallow groove.

14. An optical recording medium according to claim 13, wherein the substantially constant depth of the deep groove is at least twice the depth of the shallow groove.

15. An optical recording medium according to claim 14, wherein the deep groove has a depth of about 2.5 to 3 times the depth of the shallow groove.

16. An optical recording medium on which information is recorded by irradiating said medium with a light spot focused through a focusing lens to cause a local characteristic change therein and recorded information is reproduced by said light spot irradiation and detection of reflected light from the medium through said focusing lens, said optical recording medium including: groves formed in a same substantially horizontal surface of said medium extending substantially in parallel to a base surface of said medium, adjacent grooves having different optical depths from each other with respect to said same substantially horizontal surface and which extend in a direction in which said light spot is moved relative to said medium and which are alternately and periodically formed in a direction perpendicular to said relative movement direction of said light spot such that the adjacent grooves thereof can be simultaneously covered by said light spot; and recording regions provided on areas of said substantially horizontal surface which is a track center formed between said adjacent grooves; one of said adjacent grooves having a shallow depth of substantially constant depth and the other of said adjacent grooves having a deep depth of substantially constant depth, the depth of the shallow groove being about 0.1/n where n is the refractive index of the base of said medium.

17. An optical recording medium according to claim 16, wherein the depth of the deep groove is at least twice the depth of the shallow groove.

18. An optical recording medium according to claim 17, wherein the depth of the deep groove is 2.5 to 3 times the depth of the shallow groove.

19. An optical recording medium on which information is recorded by irradiating said medium with a light spot focused through a focusing lens to cause a local characteristic change therein and recorded information is reproduced by said light spot irradiation and detection of reflected light from the medium through said focusing lens, said optical recording medium including: grooves formed in a same substantially horizontal surface of said medium extending substantially in parallel to a base surface of said medium, adjacent grooves having different optical depths from each other with respect to said same substantially horizontal surface and which extend in a direction in which said light spot is moved relative to said medium and which are alternately and periodically formed in a direction perpendicular to said relative movement direction of said light spot such that the adjacent grooves thereof can be simultaneously covered by said light spot; and recording regions provided on areas of said substantially horizontal surface which is a track center formed between said adjacent grooves; one of said adjacent grooves being a shallow groove of substantially constant depth and the other of said adjacent grooves being a deep groove of substantially constant depth, a difference in depth between the shallow groove and the deep groove being about (0.15/n) μm to (0.2/n) μm where n is the refractive index of the base of said medium.

20. An optical recording medium according to claim 19, wherein the depth of the deep groove is at least twice the depth of the shallow groove.

21. An optical recording medium according to claim 20, wherein the depth of the deep groove is about 2.5 to 3 times the depth of the shallow groove.

22. An apparatus for recording and reproducing information on and from an optical recording medium, comprising recording and reproducing means for irradiating light and focusing the light through a focusing lens to form a light spot on the medium to cause a local characteristic change in the medium for reproducing recorded information from the medium by detecting reflected light of the light spot from the medium through the focusing lens; the optical recording medium including: grooves formed in a same substantially horizontal surface of the medium extending substantially and parallel to a base surface of the medium, adjacent grooves having different optical depths from each other with respect to said same substantially horizontal surface and which extend in a direction in which said light spot is moved relative to said medium and which are alternately and periodically formed in a direction perpendicular to said relative movement of said light spot such that the adjacent grooves thereof can be simultaneously covered by said light spot; and recording regions provided on areas of said substantially horizontal surface formed which is a track center between said adjacent grooves.

23. An apparatus according to claim 22, wherein one of the adjacent grooves is a shallow groove of substantially constant depth and the other of the adjacent grooves is a deep groove of substantially constant depth, the deep groove having a depth substantially greater than that of the shallow groove.

24. An apparatus according to claim 23, wherein the depth of the deep groove is at least twice the depth of the shallow groove.

* * * * *